US008521338B2

(12) United States Patent
Takeuchi et al.

(10) Patent No.: US 8,521,338 B2
(45) Date of Patent: Aug. 27, 2013

(54) VEHICLE CONTROL SYSTEM

(75) Inventors: Keisuke Takeuchi, Susono (JP); Toshio Tanahashi, Susono (JP); Ken Koibuchi, Hadano (JP); Kaiji Itabashi, Gotenba (JP); Shin Noumura, Susono (JP); Hiroyuki Hanamura, Gotenba (JP); Yoji Takanami, Anjo (JP); Norimi Asahara, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 74 days.

(21) Appl. No.: 13/386,773

(22) PCT Filed: Aug. 18, 2010

(86) PCT No.: PCT/JP2010/063914
§ 371 (c)(1),
(2), (4) Date: Jan. 24, 2012

(87) PCT Pub. No.: WO2011/021634
PCT Pub. Date: Feb. 24, 2011

(65) Prior Publication Data
US 2012/0136506 A1 May 31, 2012

(30) Foreign Application Priority Data

Aug. 18, 2009 (JP) ................................. 2009-189499
Mar. 12, 2010 (JP) ................................. 2010-056598

(51) Int. Cl.
*G05D 1/00* (2006.01)
*G06F 7/00* (2006.01)
*G06F 17/00* (2006.01)

(52) U.S. Cl.
USPC ................................................ 701/1; 701/37

(58) Field of Classification Search
USPC ................................................ 701/1, 37, 38
See application file for complete search history.

(56) References Cited

U.S. PATENT DOCUMENTS

| 5,895,435 A | 4/1999 | Ohta et al. | |
|---|---|---|---|
| 2008/0091317 A1* | 4/2008 | Green | 701/38 |
| 2008/0097674 A1 | 4/2008 | Kuwahara et al. | |

FOREIGN PATENT DOCUMENTS

| JP | A-06-249007 | 9/1994 |
|---|---|---|
| JP | A-10-077893 | 3/1998 |
| JP | A-10-269499 | 10/1998 |
| JP | A-11-132072 | 5/1999 |
| JP | A-2008-101742 | 5/2008 |
| JP | A-2010-163040 | 7/2010 |

OTHER PUBLICATIONS

International Search Report in International Application No. PCT/JP2010/063914; dated Nov. 9, 2010 (with English-language translation).

* cited by examiner

*Primary Examiner* — Mary Cheung
*Assistant Examiner* — Frederick Brushaber
(74) *Attorney, Agent, or Firm* — Oliff & Berridge, PLC

(57) ABSTRACT

A vehicle control system capable of improving drivability by reflecting driving environment and driving preference accurately on driving characteristics. The vehicle control system is configured to change an index for setting driving characteristics of the vehicle. When accelerations Gx and Gy are changed, a sportiness index is changed in a different manner depending on a detail of an operation for changing accelerations Gx and Gy executed by a driver, thereby reflecting the driving preference of the driver appearing on the operation can be reflected on sportiness of the vehicle.

6 Claims, 19 Drawing Sheets $Pa, \Delta Pa, Br, \Delta Br, \theta, \Delta \theta$
$(I_{out}, Vd, \delta)$ ⟶ Large

VEHICLE CONTROL SYSTEM

TECHNICAL FIELD

The present invention relates to a control system for a vehicle, which is configured to control characteristics of the vehicle relating to a behavior such as power, steering, suspension acceleration etc. (as will be called "driving characteristics" hereinafter) according to driving environment or driver's preference or intention.

BACKGROUND ART

A speed of the vehicle is changed by operating an accelerator and a brake, and a traveling direction of the vehicle is changed by operating a steering. However, a relation between an operating amount of those devices by the driver and an amount of change in the behavior of the vehicle is determined taking into consideration various requirements for the vehicle such as energy efficient, fuel economy, ride quality, quietness and so on.

In addition, the vehicle is driven under various environmental situations. For example, the vehicle is driven not only in an urban area but also on a highway, and sometimes vehicle climes an uphill and drives downhill. Moreover, every driver has a different preference in drive feeling, and every driver therefore receives a different impression from the vehicle in each situation. The vehicle can meet the specific driver's preference of the drive feeling under a specific environmental situation, however, if the driving situation is changed, the vehicle may not satisfy the driver's expected drive feeling. In addition, if the driver is changed, the vehicle may not provide an expected drive feeling of the different driver. In those cases, the driver may feel that he/she is required to operate the accelerator, brake, steering and so on more than necessary. For this reason, an impression about the drive feeling of the vehicle may be degraded.

In order to solve the above-explained problem, according to the prior art, the vehicle has been improved to allow the driver to select a driving mode for changing a power, acceleration, suspension etc. of the vehicle manually by a mode selecting switch. For example, according to the vehicle thus structured, the drive mode can be selected from a sporty mode where the acceleration is enhanced and hardness of the suspension is slightly hardened, a normal mode where the acceleration and suspension are moderated, an economy mode where fuel economy is improved and so on.

Various kinds of control systems for controlling behaviors of the vehicle according to a driver's preference have been developed in the prior art. According to those kinds of systems, driving characteristics of the vehicle can be customized without operating a switch. For example, Japanese Patent Laid-Open No. 06-249007 discloses a driving force control system for vehicle using a neuro-computer. Specifically, according to the teachings of Japanese Patent Laid-Open No. 06-249007, a relation between acceleration stroke and vehicle speed is learnt as a demand acceleration model, and a throttle sensibility is calculated on the basis of a deviation between the demand acceleration model and a second reference acceleration model reflecting running disposition of the driver, and a deviation between the second reference acceleration model and a standard first reference acceleration model.

Thus, the driving force control system taught by Japanese Patent Laid-Open No. 06-249007 is configured to change the driving characteristics of the vehicle in accordance with longitudinal acceleration and disposition of the driver. However, this kind of control system has to be further improved to read driver's intention.

DISCLOSURE OF THE INVENTION

The present invention has been conceived noting the technical problems thus far described, and its object is to provide a vehicle control system capable of reflecting an intention of a driver accurately on driving characteristics of the vehicle.

In order to achieve the above-mentioned object, according to the present invention, there is provided a vehicle control system, which is configured to change an index for setting driving characteristics of a vehicle according to acceleration of the vehicle. According to the present invention, the index is changed in different manner depending on a detail of an operation for changing acceleration executed by a driver.

If the index is determined on the basis of a large absolute value of the acceleration, the index is inhibited to be lowered to the index to be determined on the basis of a small absolute value of the acceleration in case an amount of the operation or a change rate of the amount of the operation is large. To the contrary, in case an amount of the operation or a change rate of the amount of the operation is small, the index determined on the basis of a large absolute value of the acceleration is facilitated to be lowered to the index to be determined on the basis of a small absolute value of the acceleration.

Specifically, the index determined on the basis of the large absolute value of the acceleration is inhibited to be lowered to the index to be determined on the basis of the small absolute value of the acceleration under the following conditions. For example, the index determined on the basis of the large absolute value of the acceleration is inhibited to be lowered in case the current index is determined on the basis of the large absolute value of the acceleration, in comparison with a case in which the index is determined on the basis of the small absolute value of the acceleration. The index determined on the basis of the large absolute value of the acceleration is also inhibited to be lowered to the index to be determined on the basis of the small absolute value of the acceleration in case the vehicle is running at high speed, in comparison with a case in which the vehicle is running at low speed. In addition, the index determined on the basis of the large absolute value of the acceleration is also inhibited to be lowered to the index to be determined on the basis of the small absolute value of the acceleration in case a gradient of a downhill on which the vehicle is running is large, in comparison with a case in which the gradient of the downhill on which the vehicle is running is small.

According to the present invention, the index includes: a first index, which is determined on the basis of actual acceleration detected by an acceleration sensor, and which is increased according to an increase in an absolute value of the actual acceleration; and a second index, which is determined on the basis of estimated acceleration estimated by an acceleration estimating means, and which is increased according to an increase in an absolute value of the estimated acceleration. Therefore, the aforementioned driving characteristics are adjusted on the basis of the larger index out of the first index and the second index.

The aforementioned operation of the driver includes at least any of: an accelerating operation for changing an output of a prime mover of the vehicle; a braking operation for braking the vehicle; and a steering operation for changing a traveling direction of the vehicle.

Specifically, the index determined on the basis of the large absolute value of the acceleration is inhibited to be lowered to the index to be determined on the basis of a small absolute value of the acceleration by extending a time to hold the index determined on the basis of a large absolute value of the acceleration, in case the index determined on the basis of a large absolute value of the acceleration is being maintained. Alternatively, in case the index determined on the basis of the large absolute value of the acceleration is being lowered, the index determined on the basis of the large absolute value of the acceleration is inhibited to be lowered to the index to be determined on the basis of a small absolute value of the acceleration, by reducing a changing rate thereof or by stopping the change thereof.

As described, the index determined on the basis of the large absolute value of the acceleration is inhibited to be lowered to the index to be determined on the basis of a small absolute value of the acceleration by extending a time to hold the index determined on the basis of a large absolute value of the acceleration, in case the index determined on the basis of a large absolute value of the acceleration is being maintained, and in case the index determined on the basis of the large absolute value of the acceleration is being lowered, the index determined on the basis of the large absolute value of the acceleration is inhibited to be lowered to the index to be determined on the basis of a small absolute value of the acceleration, by reducing a changing rate thereof or by stopping the change thereof. According to the present invention, the index determined on the basis of the large absolute value of the acceleration is further inhibited to be lowered to the index to be determined on the basis of a small absolute value of the acceleration, in any of the following case. Specifically, the index determined on the basis of the large absolute value of the acceleration is further inhibited to be lowered: in case an operating amount or an increasing rate of the accelerating operation in a direction to increase the output of the prime mover of the vehicle is large; in case the braking operation is executed or an operating amount of the braking operation is increased; and a steering angle or an increasing rate of the steering angle of the steering operation is large.

According to another aspect of the present invention, there is provided a vehicle control system, which is configured to change an index for setting driving characteristics of a vehicle on the basis of acceleration of the vehicle, and to change at least any of a speed change characteristic determining a speed change ratio or a timing of changing the speed change ratio, an output characteristic determining an output of a prime mover with respect to an accelerating operation, a braking characteristic with respect to a braking operation, a characteristic of a suspension sustaining the vehicle, and a steering characteristic determining maneuverability with respect to a steering operation, on the basis of an execution of a manual operation. According to the present invention, the vehicle control system thus structured is characterized by comprising a function to correct the index or the driving characteristics of the vehicle being set on the basis of the index in case any of the characteristics is changed by the manual operation, in a same direction to change said any of the characteristics by the manual operation.

Specifically, a correction of the driving characteristics of the vehicle is executed in case the manual operation is carried out while the vehicle is running, and a predetermined condition set in advance according to the driving condition of the vehicle is satisfied.

According to the present invention, the acceleration includes longitudinal acceleration in an anteroposterior direction of the vehicle, and lateral acceleration in a width direction of the vehicle. The aforementioned predetermined condition is satisfied in case the acceleration of the vehicle is in any of a braking region and an acceleration region determined on the basis of the longitudinal acceleration and the lateral acceleration, and a variation of the synthesized acceleration of the longitudinal acceleration and the lateral acceleration per unit of time is smaller than a predetermined value.

Meanwhile, in case the acceleration of the vehicle is in a turning region which is determined on the basis of the longitudinal acceleration and the lateral acceleration and where a proportion of the lateral acceleration is larger than a proportion of the longitudinal acceleration, the correction of the driving characteristics of the vehicle by the manual operation is inhibited to correct the driving force, but the correction of the driving characteristics of the vehicle by the manual operation other than the driving force is allowed.

The aforementioned correction of the driving characteristics of the vehicle includes at least any of a correction of the driving characteristics itself, a correction of the index on which the driving characteristics is based, and a correction of a value of the acceleration on which the index is based.

Thus, according to the vehicle control system of the present invention, the index for setting the driving characteristics of the vehicle is changed on the basis of the actual acceleration of the vehicle or the estimated acceleration of the vehicle. In order to change the index, not only the longitudinal acceleration but also the lateral acceleration and the synthesized acceleration can be used. Therefore, the driving characteristics of the vehicle can be adjusted to enhance the agility of the vehicle, in case the acceleration is increased by the accelerating operation, in case the braking force is increased by the braking operation, in case the lateral acceleration is increased by increasing the steering angle or by increasing the vehicle speed while steering the vehicle and so on. In addition to above, details of the operation to change the acceleration carried out by the driver such as the accelerating operation, the braking operation, the steering operation etc. are used to change or set the index. That is, intention of the driver for the drive feeling is reflected on the control to set the driving characteristics of the vehicle. Especially, according to the inventions as claimed in claims 2 to 7, the intention of the driver or driving preference of the driver can be reflected on the driving characteristics more accurately to prevent deterioration in drivability. Therefore, according to the present invention, the intention of the driver can be reflected on the control to adjust the driving characteristics of the vehicle accurately.

In addition to the above-explained advantages, in case the speed change characteristic, the suspension characteristic, or the steering characteristic is changed by a manual operation under the situation in which the vehicle is running and a predetermined driving characteristics is being set, the driving characteristics of the vehicle is changed in a direction to satisfy the driver's intention or preference appearing on the manual operation, upon execution of the manual operation. According to the present invention, therefore, the intention or driving preference of the driver can be reflected more accurately on the driving characteristics such as the accelerating/decelerating characteristic, the steering characteristic etc.

BEST MODE FOR CARRYING OUT THE INVENTION

Next, the present invention will be explained in more detail. The vehicle control system according to the present invention is configured to set and alter characteristics of a vehicle relating to a behavior (as will be called "driving characteristics" hereinafter) in accordance with an index calculated on the basis of acceleration of the vehicle. Specifically, the driving characteristics of the vehicle include a characteristic of acceleration, a turning characteristic of a steering, a characteristic of a suspension. According to the present invention, the index used to adjust the driving characteristics of the vehicle is calculated not only on the basis of longitudinal acceleration but also on the basis of lateral acceleration and synthesized acceleration of the longitudinal acceleration and lateral acceleration. In order to adjust the driving characteristics of the vehicle, actual acceleration of the vehicle detected by a detecting device such as an acceleration sensor may be used to calculate the index. Alternatively, estimated acceleration estimated on the basis of an operating amount of an accelerator, an operating amount of a brake, a steering angle, a vehicle speed and so on may also be used to calculate the index.

According to the present invention, the above-explained acceleration is to be reflected on the index. That is, the index represents a driving preference or disposition of a driver emerging as the acceleration. Therefore, the index may be called as a "sportiness index". Specifically, the index is changed fundamentally based on the acceleration but not relying thereon entirely and directly. In addition, since the index is thus changed according to a change in the acceleration, the index is basically increased to a larger value in case the acceleration (including an absolute value of the acceleration, same in the following discussion) is increased, and basically decreased to a smaller value in case the acceleration is decreased.

In addition to the above-explained acceleration, according to the vehicle control system of the present invention, details of operation executed by the driver for manipulating the vehicle is used to change the index for setting the driving characteristics of the vehicle. Specifically, details of the operations carried out by the driver to change the acceleration of the vehicle are reflected on the index. For example, a depressing amount and depressing speed of an accelerator pedal to change an output of an engine and a sped change ratio of a transmission, an depressing amount and depressing speed of a brake pedal to change a braking force, a steering angle and steering speed to change a turning angle of the vehicle and so on are used to change the index.

Figure 1:
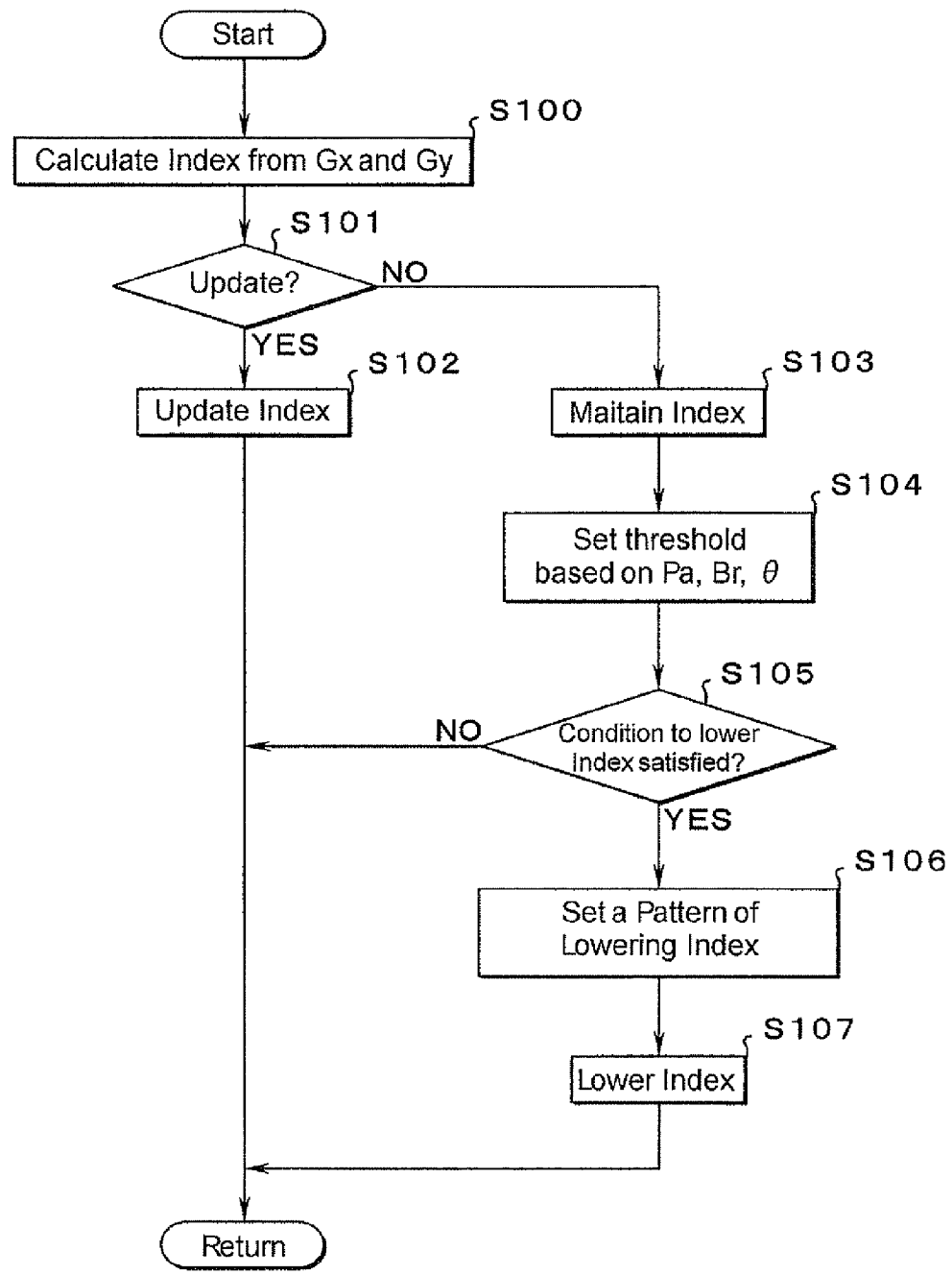
FIG. 1 is a flowchart explaining a control example to be carried out by the vehicle control system of the present invention.

FIG. 1 is a flowchart indicating a basic routine of the control to be carried out by the present invention. The routine shown in FIG. 1 is carried out repeatedly at predetermined short intervals under the situation in which the vehicle is running or in which a main switch is turned on. First of all, the index is calculated on the basis of longitudinal acceleration $G_x$ and lateral acceleration $G_y$ (including both acceleration and deceleration) (at step S100). For example, the index may be calculated on the basis of actual longitudinal acceleration Gx and actual lateral acceleration Gy detected by an acceleration detecting device (i.e., an acceleration sensor) configured to detect the acceleration in each direction. Alternatively, the index may also be calculated on the basis of estimated longitudinal acceleration Gx and estimated lateral acceleration Gy estimated from a drive demand based on a depression of the accelerator, a braking demand based on a depression of a brake pedal, a turning demand based on a steering angle and so on. In order to detect the accelerations Gx and Gy, the acceleration sensor may be arranged individually in both longitudinal and lateral directions. Alternatively, the accelerations Gx and Gy may also be obtained by arranging one acceleration sensor at an angle of 45 degrees with respect to the longitudinal direction of the vehicle, and by calculating on the basis of acceleration detected by the sensor thus arranged obliquely.

As described, driving preference of the driver is inferred from the acceleration to be reflected on the index, and the index is used to adjust the driving characteristics of the vehicle. Therefore, the index is increased according to an increase of the acceleration, and decreased according to a decrease in the acceleration and upon the satisfaction of a predetermined another condition. That is, the index is easily to be changed in a direction to enhance agility (i.e., sportiness) of the vehicle, but difficult to be changed in the opposite direction. As described, both of the actual acceleration and the estimated acceleration may be used to calculate the index. Therefore, according to the present invention, the index calculated on the basis of the actual acceleration will be called the "first index", and the index calculated on the basis of the estimated acceleration will be called the "second index".

Then, it is judged whether or not a condition to increase the index, that is, to update the index in the direction to enhance agility of the vehicle is satisfied (at step S101). Specifically, in case the obtained acceleration or a peak value thereof is larger than a previous value, the answer of step S101 is YES. In this case, the index is updated to a value based on the obtained current acceleration (at step S102), and the routine is then returned.

To the contrary, in case the obtained current acceleration or a peak value thereof is smaller than the previous value so that the answer of step S101 is NO, the index is maintained to a previous value (at step S103). Then, a threshold used to judge a satisfaction of the condition to change the index is determined (at step S104). Specifically, the threshold is set on the basis of the details of operations executed by the driver to accelerate or decelerate the vehicle, and to turn the vehicle. For this purpose, the following parameters such as an opening degree of the accelerator Pa and a change rate $\Delta Pa$ thereof, an execution of operation of the brake Br or a change rate $\Delta Br$ of an operating amount of the brake Br, a steering angle $\theta$ or a change rate $\Delta \theta$ thereof and so on may be used to determine the threshold. Specifically, the threshold is set to a larger value if those parameters are large, and in case the threshold is set to a large value, the index is prevented from being lowered easily.

After thus setting the threshold used as a criterion to lower the index, it is judged whether or not a condition to lower the index is judged on the basis of the threshold thus determined (at step S105). That is, the details of operations carried out by the driver are reflected on the index for setting the driving characteristics of the vehicle. Examples of the condition to lower the threshold will be explained later. In case the answer of step S105 is NO, the index will not be lowered and the routine is returned to maintain the previous value of the index. To the contrary, in case the answer of step S105 is YES, a pattern of lower the index is set (at step S106). The pattern to be set at step S106 is used to determine a lowering ratio (i.e., a lowering rate) of the index and a manner of lowering the index (e.g., stepwise or linearly). Specifically, the pattern of lowering the index is also set on the basis of the above-explained parameters for setting the threshold such as the opening degree of the accelerator Pa and the change rate $\Delta Pa$ thereof, the execution of operation of the brake Br or the change rate $\Delta Br$ of an operating amount of the brake Br, the steering angle $\theta$ or the change rate $\Delta \theta$ thereof and so on. For this purpose, a map for lowering the index is prepared in advance, and the lowering rate and the lowering pattern of the index is determined with reference to the map. Then, the value of the index is lowered (at step S107), and the routine is returned.

Thus, according to the vehicle control system of the present invention, not only the acceleration of the vehicle but also the details of the operation carried out by the driver to change the behavior of the vehicle are reflected on the index for adjusting the driving characteristics of the vehicle. Therefore, the driving preference of the driver is reflected on the driving characteristics of the vehicle accurately so that the drive feeling of the vehicle can be adjusted in accord with the driver's preference.

Figure 24:
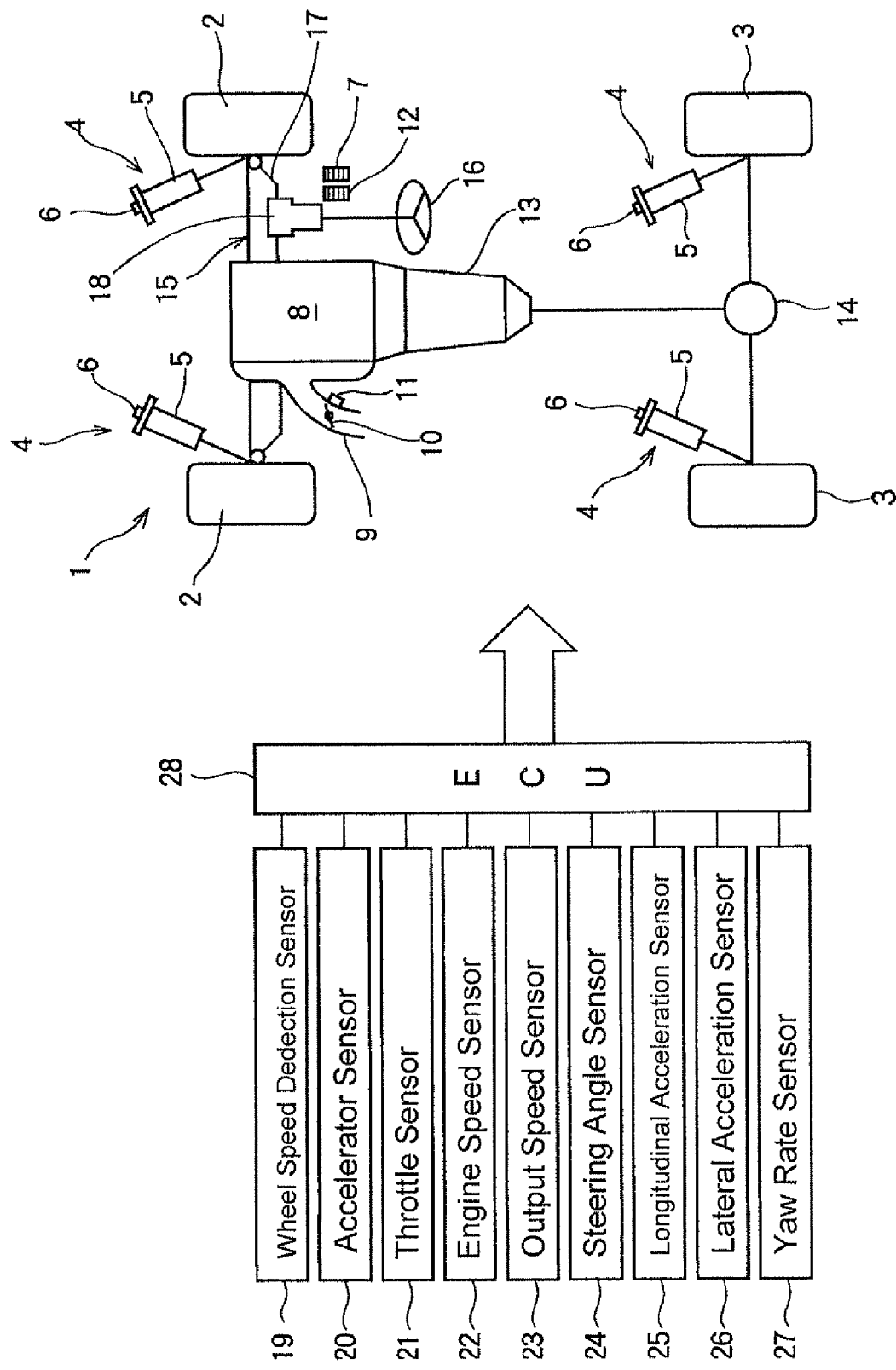
FIG. 24 is a view schematically showing a vehicle to which the present invention is applied.

Next, the above-explained control, that is, the vehicle control system of the present invention will be explained in more detail. First of all, an example of the vehicle to which the present invention is applied is to be explained hereinafter. Specifically, the vehicle control system is applied to a vehicle using an engine or a motor as a prime mover whose speed and travelling direction is controlled by the driver. FIG. 24 is a block diagram showing an example of the vehicle. As shown in FIG. 24, a vehicle 1 is provided with a pair of front wheels 2 and a pair of rear wheels 3. Specifically, each of the front wheel 2 serve as a steering wheel, and each of the rear wheel 3 serves as a driven wheel. Those wheels 2 and 3 are individually attached to a not shown vehicle body via a suspension 4. The suspension 4 is a conventional suspension device composed mainly of a not shown spring and a shock absorber (i.e., a damper) 5. The shock absorber 5 shown in FIG. 24 is configured to absorb a shock utilizing a flow resistance of air or liquid, and the flow resistance therein can be increased and decreased by a motor 6 functioning as an actuator. For example, in case of increasing the flow resistance in the shock absorber 5, a hardness of the suspension 4 in enhanced so that the vehicle 1 becomes difficult to be depressed. As a result, the drive feeling of the vehicle 1 becomes much sporty rather than comfortable. In addition, a height of the vehicle 1 can be adjusted by adjusting pressurized air in the shock absorber 5.

Although not especially shown in FIG. 24, the front and rear wheels 2 and 3 are provided individually with a brake mechanism. Those brake mechanisms are actuated to apply braking force to the wheels 2 and 3 by depressing a brake pedal 7 arranged in a driver seat.

A conventional internal combustion engine, a motor, a combination of the engine and the motor and so on may be used as a prime mover of the vehicle 1, and in the example shown in FIG. 24, an internal combustion engine 8 is used as the prime mover. As shown in FIG. 24, a throttle valve 10 for controlling air intake is arranged in an intake pipe 9 of the engine 8. Specifically, the throttle valve 10 is an electronic throttle valve, which is opened and closed by an actuator 11 such as a motor controlled electrically. The actuator 11 is actuated in accordance with a depression of an accelerator pedal 12 arranged in the driver seat, that is, in accordance with an opening degree of an accelerator, thereby adjusting an opening degree of the throttle valve 10 to a predetermined angle.

A relation between an opening degree of the accelerator and an opening degree of the throttle valve 10 may be adjusted arbitrarily, and if a ratio of the opening degree of the accelerator to the opening degree of the throttle valve is approximately one to one, the throttle valve 10 reacts directly to the operation of the accelerator so that the sportiness of the vehicle 1 is enhanced. To the contrary, in case of reducing the opening degree of the throttle valve 10 relatively with respect to the opening degree of the accelerator, the drive feeling of the vehicle 1 is moderated. In case of using the motor as the prime mover, a current control device such as an inverter or a converter is used instead of the throttle valve 10. In this case, a relation between the opening degree of the accelerator and a current value, that is, the drive feeling of the vehicle 1 is changed arbitrarily by adjusting the current in accordance with the opening degree of the accelerator by the current control device.

A transmission 13 is connected with an output side of the engine 8. The transmission 13 is configured to change a speed change ratio between an input speed and an output speed arbitrarily. For example, a conventional automatic geared transmission, a belt-type continuously variable transmission, a toroidal type transmission may be used in the vehicle 1. Specifically, the transmission 13 is provided with a not shown actuator, and configured to change the speed change ratio thereof stepwise or continuously by controlling the actuator. Basically, the transmission 13 is controlled to optimize the speed change ratio to improve fuel economy. For this purpose, a speed change map for determining the speed change ratio according to a speed of the vehicle 1 and the opening degree of the accelerator is prepared in advance, and the speed change operation of the transmission 13 is carried out with reference to the map. Alternatively, the speed change ratio of the transmission 13 is optimized by calculating a target output on the basis of the speed of the vehicle 1 and the opening degree of the accelerator, calculating a target engine speed on the basis of the calculated target output and an optimum fuel curve, and carrying out a speed change operation to achieve the obtained target engine speed.

A driving mode of the vehicle 1 to which the vehicle control system according to the present invention is applied can be selected from a fuel saving mode for reducing fuel consumption and a power mode for increasing a driving force. Specifically, under the fuel saving mode, an upshifting is carried out at relatively low speed, and the speed change ratio is kept to a relatively small ratio even in case the vehicle is driven at low speed. To the contrary, under the power mode, the upshifting is carried out at relatively high speed, and the speed change ratio is kept to a relatively large ratio even in case the vehicle is driven at high speed thereby increasing the driving force and enhancing acceleration. Those speed controls are carried out by switching the speed change map while correcting the drive demand or the calculated speed change ratio. In addition, a transmission mechanism such as a torque converter having a lockup clutch may be arranged between the engine 8 and the transmission 13 according to need. An output shaft of the transmission 13 is connected with the rear wheels 3 via a differential gear 14 used as a final reducing mechanism.

Here will be explained a steering mechanism 15 for changing an orientation of the front wheels 2. The steering mechanism 15 comprises: a steering wheel 16; a steering linkage 17 configured to transmit a rotation of the steering wheel 16 to the front wheels 2; and an assist mechanism 18 configured to assist a steering angle and a steering force of the steering wheel 16. The assist mechanism 18 is provided with a not shown actuator, and configured to control an assisting amount of the actuator. Therefore, a ratio of the steering force (or angle) of the steering wheel 16 to an actual steering force (or angle) of the front wheels 2 can be approximated to one to one by reducing the assisting force of the assist mechanism 18. As a result, the front wheels 2 can be turned directly in response to the rotation of the steering wheel 16 so that the sportiness of the vehicle 1 is enhanced.

Although not especially shown, in order to stabilize a behavior and attitude of the vehicle 1, the vehicle 1 is further provided with an antilock brake system (abbreviated as ABS), a traction control system, and a vehicle stability control system (abbreviated as VSC) for controlling those systems integrally. Those systems are known in the art, and adapted to stabilize the behavior of the vehicle 1 by preventing a locking and slippage of the wheels 2 and 3. For this purpose, those systems are configured to control a braking force applied to the wheels 2 and 3 on the basis of a deviation between a vehicle speed and a wheel speed while controlling the engine torque. In addition, the vehicle 1 may be provided with a navigation system for obtaining data on road information and a contemplated route (i.e., data on driving environment), and a mode selecting switch for selecting a drive mode manually from a sporty mode, a normal mode, an energy saving mode (i.e., economy mode) and so on. Further, a 4-wheel-drive mechanism (4WD) configured to change the driving characteristics such as a hill-climbing ability, acceleration, a turning ability and so on may be arranged in the vehicle 1.

In order to obtain data for controlling the engine 8, the transmission 13, the shock absorber 5 of the suspension 4, the assist mechanism 18, and the above-explained not shown systems, various kinds of sensors are arranged in the vehicle 1. For example, a wheel speed detection sensor 19 adapted to detect a rotational speed of each wheel 2 and 3, an accelerator sensor 20 adapted to detect an opening degree of the accelerator, a throttle sensor 21 adapted to detect an opening degree of the throttle valve 10, an engine speed sensor 22 adapted to detect a speed of the engine 8, an output speed sensor 23 adapted to detect an output speed of the transmission 13, a steering angle sensor 24, a longitudinal acceleration sensor 25 adapted to detect the longitudinal acceleration (Gx), a lateral acceleration sensor 26 adapted to detect the lateral (or transverse) acceleration (Gy), a yaw rate sensor 27 and so on are arranged in the vehicle 1. Here, acceleration sensors used in the above-explained behavior control systems such as the antilock brake system (ABS) and a vehicle stability control system (VSC) may be used as the acceleration sensors 25 and 26, and if an air-bag is arranged in the vehicle 1, acceleration sensors for controlling an actuation of the air-bag may also be used as the acceleration sensors 25 and 26. In addition, as described, the longitudinal acceleration Gx and the lateral acceleration Gy may also be obtained by arranging one acceleration sensor oriented to predetermined angle with respect to the longitudinal direction of the vehicle 1 (e.g., at 45 degrees), and by resolving a detected value into the longitudinal acceleration and the lateral acceleration. Alternatively, the longitudinal acceleration Gx and the lateral acceleration Gy may also be calculated on the basis of an opening degree of the accelerator, a road load, a steering angle and so on. Detection signals (i.e., data) of those sensors 19 to 27 are transmitted to an electronic control unit (abbreviated as ECU) 28. The ECU 28 is configured to carry out a calculation on the basis of the data inputted thereto and data and programs stored in advance, and to output a calculation result to the above-explained systems or the actuators thereof in the form of a control command signal. In addition, the above-explained index may be calculated not only on the basis of a synthesized acceleration composed of a plurality of components of acceleration such as a longitudinal component and the lateral (or widthwise) component, but also calculated on the basis of unidirectional acceleration such as the longitudinal acceleration.

The vehicle control system according to the present invention is configured to reflect the driving state of the vehicle on the behavior control of the vehicle. Specifically, the driving state includes the longitudinal acceleration, the lateral acceleration, yawing acceleration, rolling acceleration, and a synthesized acceleration composed of a plurality of components of acceleration in different directions. Basically, in case of driving a vehicle at a desired speed in a desired direction, or in case of adjusting a behavior of the vehicle to a desired behavior in accordance with the driving environment such as a road surface, the vehicle is accelerated in a plurality of directions. This means that the driving state of the vehicle reflects the driving environment and a driving preference of the driver to some extent. For this reason, according to the present invention, the vehicle control system is configured to reflect the driving state of the vehicle on the behavior control of the vehicle.

As described, the behavior of the vehicle includes the acceleration, a turning motion, a bumping and rebound of the suspension 4, a rolling, a pitching and so on. Therefore, according to the vehicle control system of the present invention, above-listed driving states or motions of the vehicle are used as a factor of changing the driving characteristics of the vehicle. For this purpose, the acceleration value of any one of directions, or the synthesized acceleration value may be used as the index for changing the driving characteristics of the vehicle without being corrected. However, in order to reduce a gap between an expected drive feeling of the driver and an actual drive feeling of the vehicle, those acceleration values may be corrected to be used as the index for adjusting the driving characteristics of the vehicle.

Here will be explained a "sportiness index (abbreviated as SPI)" as an example of the above-explained index. Specifically, the sportiness index is an index representing an intention of the driver or the driving state of the vehicle. According to the present invention, the sportiness index can be obtained by synthesizing a plurality of (absolute values of) accelerations in different directions. Especially, the synthesized acceleration of the longitudinal acceleration Gx and the lateral acceleration Gy strongly influence the behavior of the vehicle in the travelling direction. Therefore, such synthesized acceleration value is used as an "instant sportiness index". For example, the instant sportiness index can be calculated by the following formula:

$$\text{Instant sportiness index } I_{in} = (Gx^2 + Gy^2)^{1/2}$$

Here, the accelerations to be used to calculate the instant sportiness index $I_{in}$ should not be limited to the acceleration detected by the acceleration sensors. That is, accelerations calculated or estimated from operations of the driver such as an opening degree of the accelerator, a steering angle, a depression of the brake pedal and so on may also be used to calculate the instant sportiness index. Specifically, a definition of the "instant sportiness index $I_{in}$" is an index determined by obtaining the acceleration of the running vehicle in each direction and in each moment, and by calculating on the basis of obtained instant acceleration. That is, the instant sportiness index $I_{in}$ is a physical amount. Here, a definition of the expression "in each moment" is each time point to calculate the instant sportiness index $I_{in}$ in each cycle of the calculation being repeated in a predetermined cycle time.

At least one of positive acceleration and negative acceleration (i.e., deceleration) of the longitudinal acceleration Gx may be normalized or weighted to be used in the above formula. In case of driving the vehicle, an actual negative acceleration is larger than an actual positive acceleration. However, the driver cannot sense such difference between the actual negative acceleration and the actual positive acceleration in most cases. That is, the driver is basically unable to recognize the difference between the actual negative acceleration and the actual positive acceleration. Therefore, in order to correct a gap between the actual acceleration value and the acceleration recognized by the driver, the longitudinal acceleration Gx may be normalized by increasing the detected or calculated value of the positive acceleration, or by reducing the detected or calculated value negative acceleration (i.e., deceleration). Specifically, such normalization may be carried out by obtaining a ratio between maximum detected or calculated values of the positive acceleration and the negative acceleration, and multiplying the obtained ratio by the detected or calculated value of the positive or negative acceleration. Alternatively, a detected or calculated value of the negative acceleration value of the lateral acceleration Gy may be weighted to correct the gap. For example, a longitudinal driving force and a lateral force generated by a tire can be indicated in a friction circle. Likewise, those normalization or weighting is a process to maintain maximum accelerations in each direction within a circle of predetermined radius by weighting at least one of the positive and negative acceleration values. As a result of such normalization and weighting, an influence of the positive acceleration and an influence of the negative acceleration on the control to change the driving characteristics of the vehicle are differentiated. For example, the positive acceleration value and the negative acceleration value of the longitudinal acceleration Gx are weighted in a manner to increase the influence of the positive acceleration on the control to change the driving characteristics of the vehicle in comparison with that of the negative acceleration. Here, the lateral acceleration may be larger than the positive acceleration of the longitudinal acceleration Gx. Therefore, the lateral acceleration Gy may also be normalized or weighted.

Thus, a degree of the gap between the actual acceleration value and the acceleration sensed by the driver is different depending on the direction of the acceleration. For example, the degree of the gap between the actual acceleration value and the acceleration sensed by the driver in the yawing direction of the vehicle is different from that in the rolling direction of the vehicle. Therefore, according to the vehicle control system of the present invention, a degree to reflect the acceleration on the control to change the driving characteristics of the vehicle, in other words, a degree to change the driving characteristics of the vehicle according to the acceleration can be differentiated depending on the direction of the acceleration.

Figure 2:
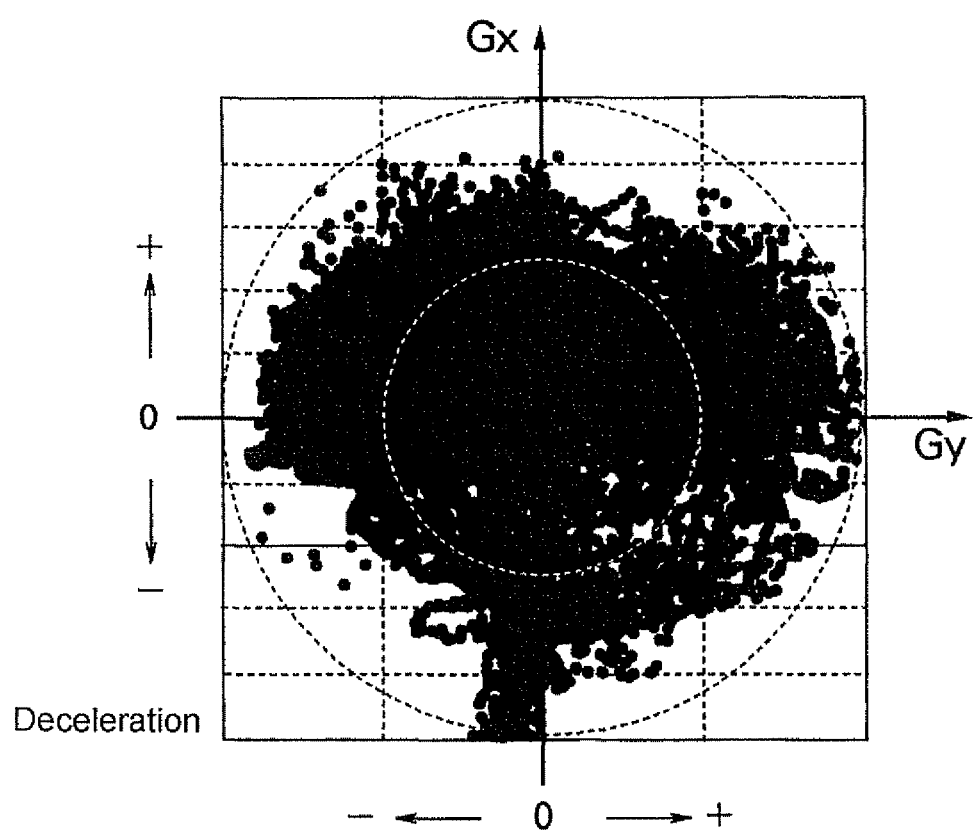
FIG. 2 is a friction circle plotting detected value of longitudinal acceleration and lateral acceleration.

FIG. 2 is a friction circle plotting sensor values of the lateral acceleration Gy and normalized values of the longitudinal acceleration Gx. Those values indicated in FIG. 2 were collected by driving the vehicle in a test course imitating ordinary roads. As can be seen from FIG. 2, the lateral acceleration Gy also tends to be increased in case of decelerating the vehicle significantly, and both of the longitudinal acceleration Gx and the lateral acceleration Gy are generated generally within the friction circle.

Figure 3:
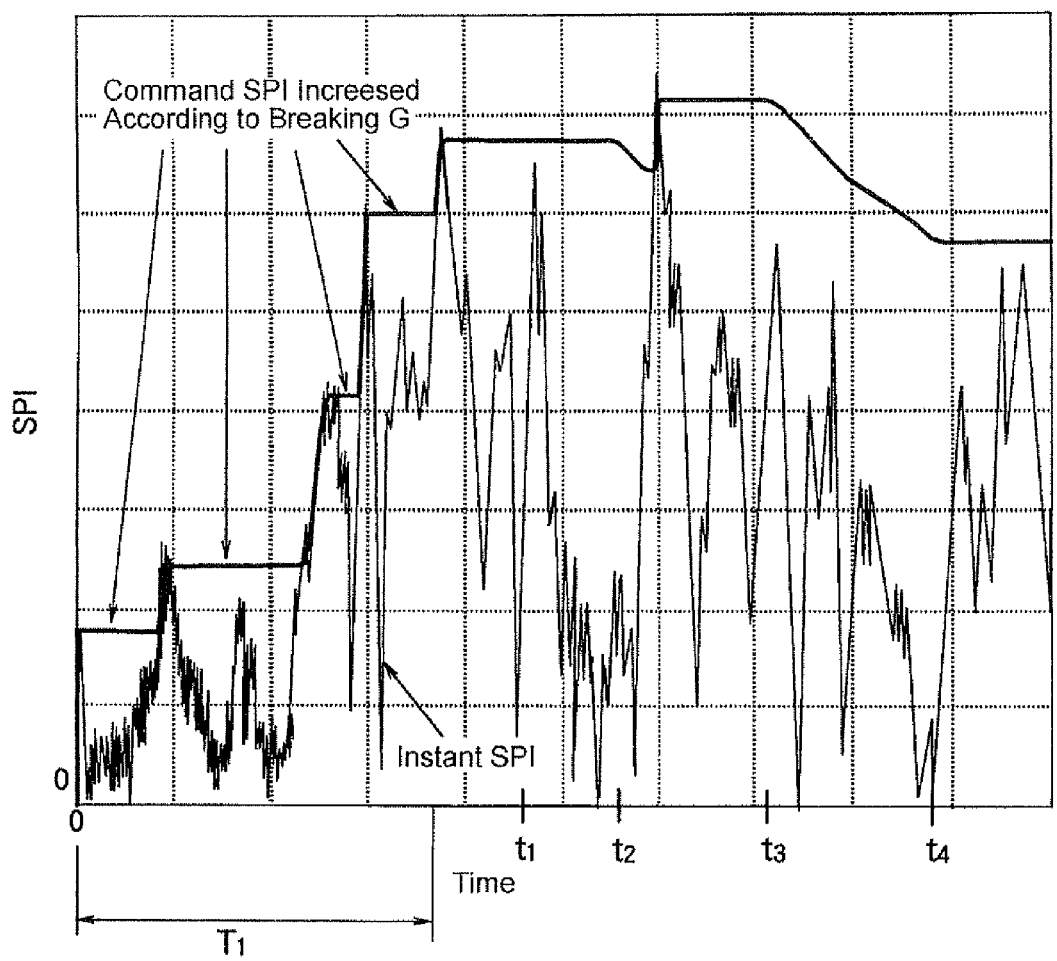
FIG. 3 is a graph indicating an example of a change in the command sportiness index according to a change in an instant sportiness index.

According to the present invention, a "command sportiness index $I_{out}$" to be used in the control for changing the driving characteristics of the vehicle is obtained on the basis of the above-explained instant sportiness index $I_{in}$. Specifically, the command sportiness index $I_{out}$ is increased immediately with an increase of the instant sportiness index $I_{in}$, but lowered after a delay with respect to a drop of the instant sportiness index $I_{in}$. Specifically, the command sportiness index $I_{out}$ is lowered based on a satisfaction of a specific condition. FIG. 3 is a graph indicating the command sportiness index $I_{out}$ being changed according to a fluctuation of the instant sportiness index $I_{in}$. Specifically, the instant sportiness index $I_{in}$ shown in FIG. 3 corresponds to the plotted values indicated in FIG. 2. Meanwhile, the command sportiness index $I_{out}$ is set on the basis of a local maximum value of the instant sportiness index $I_{in}$, and the command sportiness index $I_{out}$ is maintained until a satisfaction of a predetermined condition. Thus, the command sportiness index $I_{out}$ is increased promptly but lowered relatively slower.

Specifically, during a period T1 from a commencement of the control, the instant sportiness index $I_{in}$ is fluctuated according to a change in the acceleration resulting from a braking or turning of the vehicle etc. As shown in FIG. 3, the instant sportiness index $I_{in}$ being fluctuated is increased locally to a maximum value prior to a satisfaction of the predetermined condition to update the command sportiness index $I_{out}$. In this situation, the command sportiness index $I_{out}$ is set on the basis of each local maximum value of the instant sportiness index $I_{in}$. Therefore, the command sportiness index $I_{out}$ is increased stepwise during the period T1, and once the command sportiness index I out is set on the basis of the local maximum value of the instant sportiness index $I_{in}$, the command sportiness index $I_{out}$ thus set will not be updated until the instant sportiness index $I_{in}$ is increased to the larger local maximum value. Then, when the condition to lower the command sportiness index $I_{out}$ is satisfied, for example, when the vehicle being turned while being accelerated is started to be driven straight ahead while being accelerated at a time point t2 or t3, the command sportiness index $I_{out}$ is started to be lowered. That is, the command sportiness index $I_{out}$ is lowered in case that maintaining the previous large value of the command sportiness index $I_{out}$ is presumed to be against the driver's intention. Specifically, according to the present invention, such condition to lower the command sportiness index $I_{out}$ is satisfied according to elapsed time.

More specifically, the above-mentioned condition in that "maintaining the previous large value of the command sportiness index $I_{out}$ is presumed to be against the driver's intention" is a situation in which a divergence between the command sportiness index $I_{out}$ being maintained to the current value and the instant sportiness index $I_{in}$ is relatively large and such divergence between the indexes is being accumulated continuingly. For example, the command sportiness index $I_{out}$ will not be lowered even if the instant sportiness index $I_{in}$ is lowered instantaneously in case the accelerator pedal is returned temporarily by the driver under the situation in which the vehicle is cornering while being accelerated. Meanwhile, in case the instant sportiness index $I_{in}$ is fluctuating below the command sportiness index $I_{out}$ for a certain period of time under the situation in which the accelerator pedal is being returned continuously thereby decelerating the vehicle gradually, the aforementioned condition to lower the command sportiness index $I_{out}$ is satisfied. Thus, the length of time in which the instant sportiness index $I_{in}$ stays below the command sportiness index $I_{out}$ may be used as the condition to lower the command sportiness index $I_{out}$. In order to reflect the actual driving condition of the vehicle more accurately on the command sportiness index $I_{out}$, a temporal integration (or accumulation) of the deviation between the command sportiness index $I_{out}$ being maintained and the instant sportiness index $I_{in}$ may be used as the condition to lower the command sportiness index $I_{out}$. In this case, the command sportiness index $I_{out}$ is lowered when the temporal integration of the deviation between those indexes reaches a predetermined threshold. For this purpose, this threshold may be determined arbitrarily on the basis of a driving test or simulation carried out based on the driver's intention. Alternatively, the threshold may also be determined on the basis of results of questionnaire survey on the drive feeling of the vehicle. In case of using the temporal integration as the condition to lower the command sportiness index $I_{out}$, the command sportiness index $I_{out}$ is to be lowered taking into consideration a duration time of the divergence of the instant sportiness index $I_{in}$ from the command sportiness index $I_{out}$, in addition to the deviation between the command sportiness index $I_{out}$ and the instant sportiness index $I_{in}$. Therefore, in this case, the actual driving condition or behavior of the vehicle can be reflected on the control to change the driving characteristics of the vehicle more accurately.

In the example shown in FIG. 3, a length of time to maintain the command sportiness index I out before the time point t2 is longer than a length of time to maintain the command sportiness index $I_{out}$ before the time point t3. Those lengths of times to maintain the command sportiness index $I_{out}$ are determined by a control to be explained hereinafter. Specifically, as indicated in FIG. 3, the command sportiness index $I_{out}$ is increased to a predetermined value at the end of the aforementioned period T1 and maintained. In this situation, the instant sportiness index $I_{in}$ rises instantaneously at the time point t1 before the time point t2 at which the condition to lower the command sportiness index $I_{out}$ is to be satisfied. Therefore, an integral of the deviation between the command sportiness index $I_{out}$ and the instant sportiness index $I_{in}$ in this situation is smaller than a predetermined value, and the command sportiness index $I_{out}$ is maintained to the time point t2. Here, this predetermined value to lower the command sportiness index $I_{out}$ may be set arbitrarily on the basis of a driving test or simulation carried out based on the driver's intention while taking into consideration a calculation error of the instant sportiness index $I_{in}$. In case the instant sportiness index $I_{in}$ is thus raised close to the command sportiness index $I_{out}$, this means that the actual driving condition of the vehicle at this time point is similar to the accelerating and turning conditions upon which the current command sportiness index $I_{out}$ being maintained is based. That is, although a certain period of time has elapsed from the time point at which the current commend sportiness index $I_{out}$ being held was set, the actual driving condition of the vehicle is still similar to the condition at the time point when the current command sportiness index $I_{out}$ being maintained is set. Therefore, in this situation, a commencement to lower the command sportiness index I out is delayed even if the instant sportiness index $I_{in}$ is fluctuating below the current command sportiness index $I_{out}$ being maintained. For example, the commencement to lower the command sportiness index $I_{out}$ can be delayed by resetting the elapsed time (i.e., accumulation time) or the integral of deviation from the time point at which the current command sportiness index $I_{out}$ was set, and restarting the accumulation of the elapsed time or the integration of the deviation. Alternatively, the commencement to lower the command sportiness index $I_{out}$ may also be delayed by subtracting a predetermined value from the elapsed time of the command sportiness index $I_{out}$ or the integral of deviation between the indexes $I_{out}$ and $I_{in}$, or interrupting the accumulation of the elapsed time or the integration of the deviation for a predetermined period of time.

Figure 4:
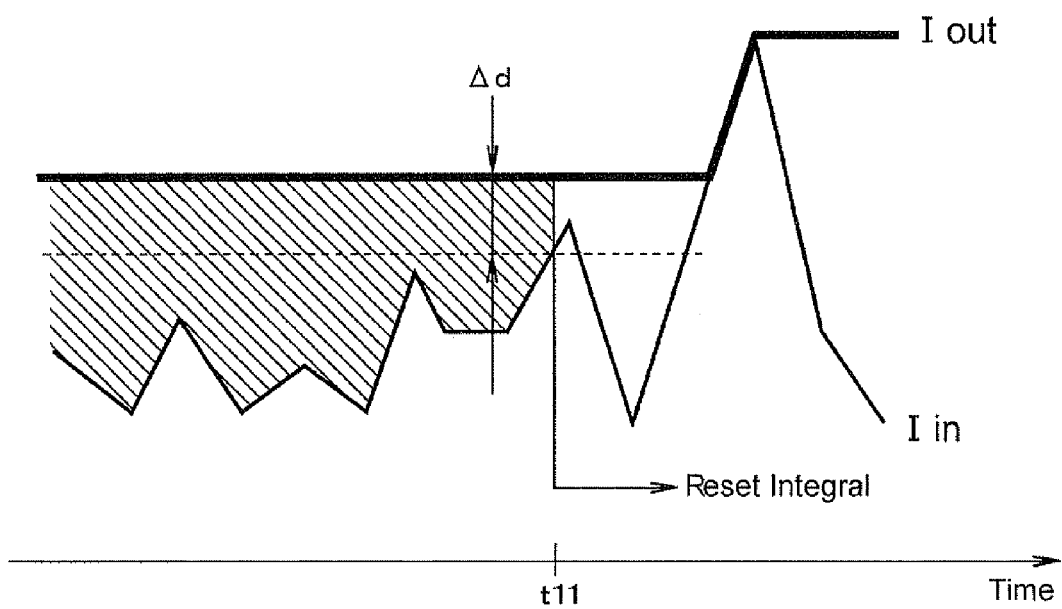
FIG. 4 is a graph indicating the integral of the deviation between the command sportiness index and the instant sportiness index, and a reset of the integral.

FIG. 4 is a graph indicating the aforementioned integral of the deviation between the command sportiness index $I_{out}$ and the instant sportiness index $I_{in}$, and the reset of the integral. In FIG. 4, a shadowed area corresponds to the integral of the deviation between the command sportiness index $I_{out}$ and the instant sportiness index $I_{in}$. In the example indicated in FIG. 4, the reset of the integral of the deviation is executed at a time point t11 at which the divergence between the command sportiness index $I_{out}$ and the instant sportiness index $I_{in}$ becomes smaller than a predetermined value Δd, and the integration of the deviation between those indexes $I_{out}$ and $I_{in}$ is restarted from the time point t1. Consequently, the condition to lower the command sportiness index $I_{out}$ is prevented from being satisfied at the time point t11 so that the command sportiness index $I_{out}$ is maintained to the previous value. Then, when the instant sportiness index $I_{in}$ exceeds the command sportiness index $I_{out}$ after restarting the integration of the deviation between the indexes $I_{out}$ and $I_{in}$, the command sportiness index $I_{out}$ is updated to the local maximum value of the instant sportiness index $I_{in}$. The command sportiness index $I_{out}$ thus updated is to be maintained and the integration of the deviation between the indexes $I_{out}$ and $I_{in}$ is reset again.

In case of thus judging the satisfaction of the condition to lower the command sportiness index $I_{out}$ on the basis of the integral of the deviation between the indexes $I_{out}$ and $I_{in}$, a degree or gradient to lower the command sportiness index $I_{out}$ may be changed depending on the situation. As explained, the aforementioned integral is a time integral of the deviation between the command sportiness index $I_{out}$ being maintained and the instant sportiness index $I_{in}$. Therefore, in case the deviation between the indexes $I_{out}$ and $I_{in}$ is large, the integral of the deviation between the indexes $I_{out}$ and $I_{in}$ reaches the predetermined value promptly so that the aforementioned condition to lower the command sportiness index $I_{out}$ is satisfied in a relatively short time. To the contrary, in case the deviation between the indexes $I_{out}$ and $I_{in}$ is small, the integral of the deviation between the indexes $I_{out}$ and $I_{in}$ reaches the predetermined value in a relatively long time. Therefore, in this case, it takes relatively long time to satisfy the aforementioned condition to lower the command sportiness index $I_{out}$. That is, in case the condition to lower the command sportiness index $I_{out}$ is satisfied in a short time, the instant sportiness index $I_{in}$ is falling significantly from the current command sportiness index $I_{out}$ being maintained. This means that the current command sportiness index $I_{out}$ is deviated away from the driver's current intention. In this case, therefore, the command sportiness index $I_{out}$ is lowered at a greater rate or steeper gradient. To the contrary, in case it takes relatively long time to satisfy the condition to lower the command sportiness index $I_{out}$, a difference between the command sportiness index $I_{out}$ being maintained and the instant sportiness index $I_{in}$ fluctuating below the command sportiness index $I_{out}$ is small. This means that the current command sportiness index $I_{out}$ being maintained is not deviated from the driver's intention significantly. In this case, therefore, the command sportiness index $I_{out}$ is lowered at a smaller rate or gentle gradient. For this reason, a gap between the command sportiness index $I_{out}$ for setting the driving characteristics of the vehicle and the driver's intention can be corrected rapidly and accurately so that the driving characteristics of the vehicle can be adjusted to the actual driving condition. Thus, in case of lowering the command sportiness index $I_{out}$ being maintained, it is preferable to differentiate the degree or gradient to lower the command sportiness index $I_{out}$ depending on a length of an elapsed time to maintain the command sportiness index $I_{out}$.

As described, the command sportiness index $I_{out}$ is a digitalized value of the driver's demand using the longitudinal acceleration Gx and the lateral acceleration Gy as parameters. However, the accelerator and the steering are being operated by the driver even when the vehicle is being driven on the basis of the currently maintained command sportiness index $I_{out}$, and the command sportiness index $I_{out}$ may be changed by those operations. For example, the operations to change the acceleration of the vehicle may also be carried out in case of adjusting an interval from a leading vehicle, or in case of changing a driving lane. That is, the operation to change the acceleration is not always representing the driving preference of the driver. Therefore, in addition to reflect the acceleration of the vehicle as the driving preference of the driver on the control to change the driving characteristics of the vehicle, a degree of changing the command sportiness index $I_{out}$ is changed depending on details of the accelerating and steering operations carried out by the driver. An example of such control is shown in FIG. 5.

Figure 5:
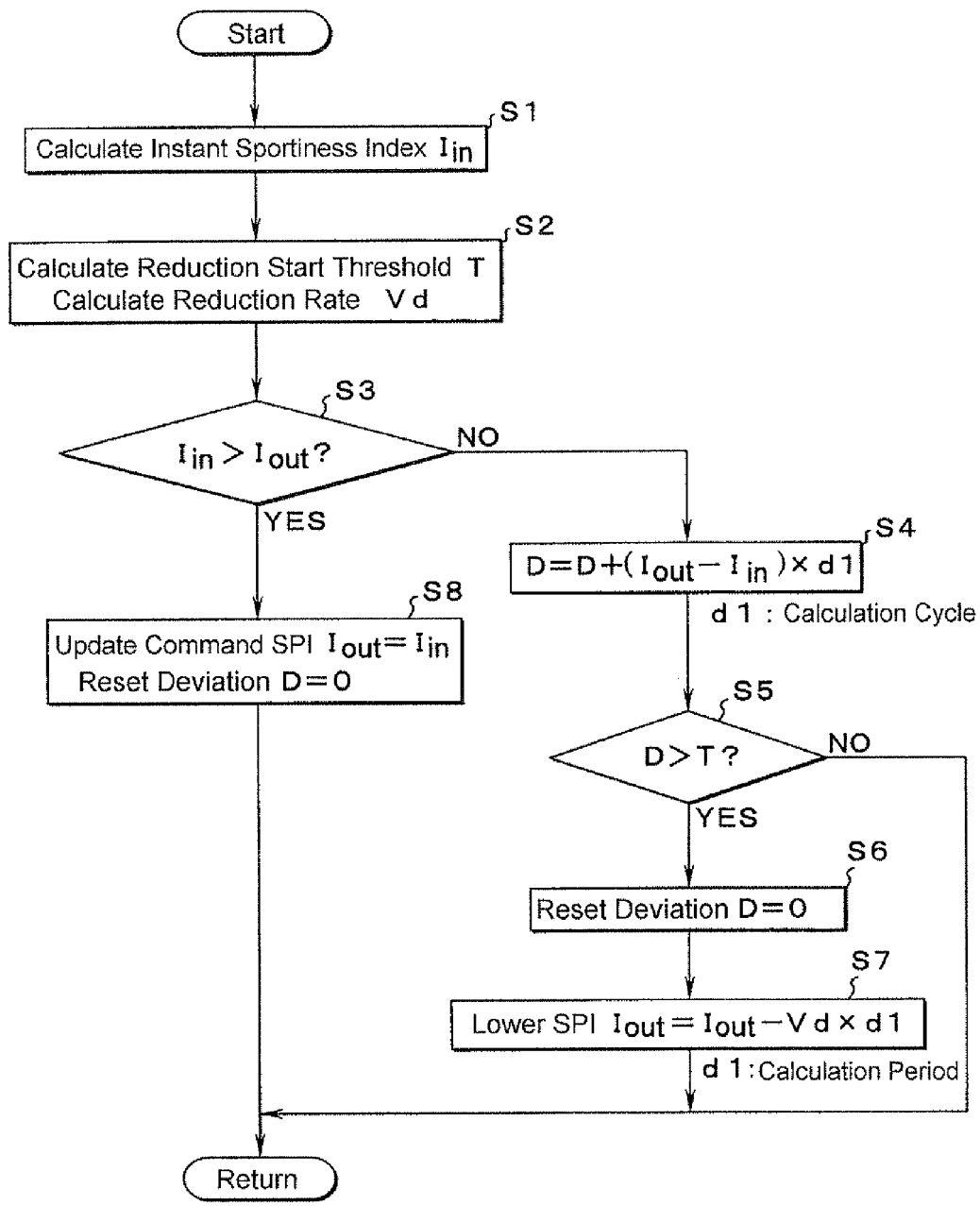
FIG. 5 is a flowchart explaining a detailed control example to be carried out by the vehicle control system of the present invention.

The routine shown in FIG. 5 is carried out repeatedly at predetermined short intervals by turning on the main switch or a starting switch, and the data such as the command sportiness index $I_{out}$ is initialized by turning off any of those switches. According to the control shown in FIG. 5, first of all, the instant sportiness index $I_{in}$ is calculated (at step S1) as explained above.

Figure 6:
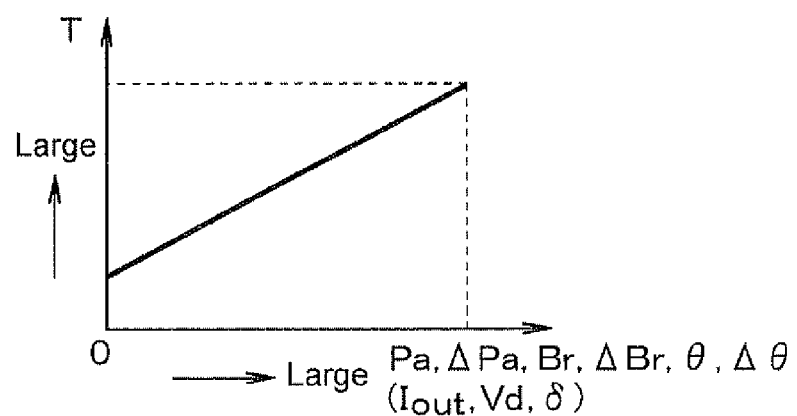
FIG. 6 is an example of a map for setting a threshold used to start reducing the index to be used in the control example.

Then, a reduction starting threshold T defining a time to start lowering the command sportiness index $I_{out}$ being maintained, and a reduction rate (i.e., percentage or gradient) Vd to lower the command sportiness index $I_{out}$ are calculated individually (at step S2). Specifically, the reduction starting threshold T is used to define a length of time for maintaining the current value of the command sportiness index $I_{out}$ being maintained. That is, in case of controlling the time to maintain the command sportiness index $I_{out}$ on the basis of the deviation between the command sportiness index $I_{out}$ and the instant sportiness index $I_{in}$ as described, the reduction starting threshold T is used to define the integral of deviation between the indexes $I_{out}$ and $I_{in}$. The threshold T may be mapped in advance as shown in FIG. 6. Specifically, FIG. 6 shows an example for setting the threshold T using at least one of the following parameters such as, an opening degree Pa of the accelerator, a change rate ΔPa of the opening degree Pa, a brake pedal force Br, a change rate ΔBr of the brake pedal force Br, a steering angle θ (absolute value), and a change rate Δθ of the steering angle θ. As indicated in FIG. 6, the threshold T is increased according to an increase in those parameters. For example, in case the accelerator pedal is depressed abruptly and deeply, the threshold T is increased according to an increase in the opening degree Pa or the change rate ΔPa thereof. As a result, the time for maintaining the current value of the command sportiness index $I_{out}$ is extended. In other words, the command sportiness index $I_{out}$ is inhibited to be changed. Likewise, in case brake pedal force Br is applied, the threshold T is increased according to an increase in the brake pedal force Br or the change rate ΔBr, and in case the steering wheel is turned, the threshold T is increased according to an increase in the steering angle θ or the change rate Δθ thereof. As a result, the threshold T is also increased so that the command sportiness index $I_{out}$ becomes difficult to be changed in both cases.

The sporty driving characteristics of the vehicle in which the response to the operations relating to the acceleration, braking and steering are improved is preferable to be maintained depending on the driving condition. For example, in case the sportiness index has already been raised to a higher value, in case the vehicle has already been driven sporty at relatively high speed, or in case the vehicle is driving down a slope and a relatively large engine braking force is required in response to an operation of the accelerator pedal, it is preferable to extend the time for maintaining the command sportiness index $I_{out}$ by increasing the threshold T shown in FIG. 6.

For this purpose, the map shown in FIG. 6 may be modified to increase the threshold T in according to an increase of the current command sportiness index $I_{out}$, a vehicle speed V, a downward gradient δ. Alternatively, it is also possible to prepare the above-explained modified map separately from the map shown in FIG. 6, and carrying out the calculation of the threshold T at step S2 on the basis of the above-explained parameters representing the current driving condition with reference to the modified map.

Figure 7:
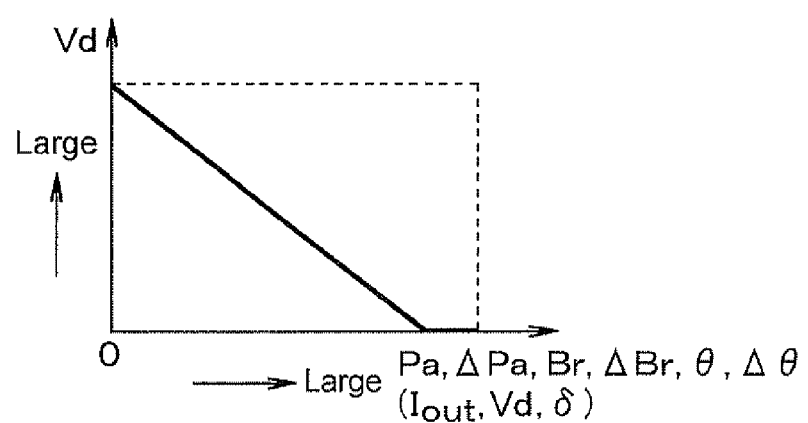
FIG. 7 is an example of a map used to set a reduction rate for lowering the index to be used in the control example.

Meanwhile, the reduction rate Vd for lowering the command sportiness index $I_{out}$ may also be obtained with reference to a map prepared in advance as shown in FIG. 7. As the map shown in FIG. 6, FIG. 7 is an example of a map for setting the reduction rate Vd using at least one of the following parameters such as, the opening degree Pa of the accelerator, the change rate ΔPa of the opening degree Pa, the brake pedal force Br, the change rate ΔBr of the brake pedal force Br, the steering angle θ (absolute value), and the change rate Δθ of the steering angle θ. As indicated in FIG. 7, the reduction rate Vd is lowered according to an increase in those parameters. That is, the command sportiness index $I_{out}$ becomes difficult to be lowered according to an increase in the values of the current the command sportiness index $I_{out}$, the vehicle speed, and the downward gradient. Here, it is also possible to stop the reduction of the command sportiness index $I_{out}$ by holding the reduction rate Vd to "0" instead of lowering the reduction rate Vd.

As the above-explained control to maintain the command sportiness index $I_{out}$, the control to thus inhibit to lower the command sportiness index $I_{out}$ may also carried out on the basis of the value of the current command sportiness index $I_{out}$, the vehicle speed V, the downward gradient δ. In this case, specifically, the reduction rate Vd is reduced according to an increase in the values of the current command sportiness index $I_{out}$, the vehicle speed V, and the downward gradient δ. For this purpose, it is also possible to prepare the modified map for setting the reduction rate Vd in the above-explained manner separately from the map shown in FIG. 7, and to carry out the calculation of the reduction rate Vd at step S2 on the basis of the above-explained parameters representing the current driving condition with reference to the modified map.

Then, it is judged whether or not the current value of the instant sportiness index $I_{in}$ is larger than the current value of the command sportiness $I_{out}$ (at step S3). In case the answer of step S3 is NO, that is, in case the value of the instant sportiness index $I_{in}$ obtained from the current acceleration of the vehicle is smaller than the current command sportiness index $I_{out}$ being maintained, the deviation between the indexes $I_{out}$ and $I_{in}$ is integrated or accumulated (at step S4). Specifically, the deviation between the current command sportiness index $I_{out}$ being maintained and the instant sportiness index obtained from the current acceleration of the vehicle can be integrated or accumulated using the following formula:

$$D=D+(I_{out}-I_{in})\cdot d1$$

where d1 represents a calculation cycle.

An integral (or accumulation) of the deviation between the indexes $I_{out}$ and $I_{in}$ thus obtained is then compared with the reduction starting threshold T calculated at step S2 (at step S5). Specifically, at step S5, it is judged whether or not the integral (or accumulation) of the deviation D is larger than the reduction starting threshold T. That is, step S5 is a step for judging a satisfaction of the aforementioned "another condition". In case the answer of step S5 is YES, a reset of the deviation between the indexes $I_{out}$ and $I_{in}$ is carried out (at step S6), and the command sportiness index $I_{out}$ is lowered (at step S7). Then, the routine is returned. As described, the reduction starting threshold T is determined with reference to the map shown in FIG. 6. Therefore, in case the vehicle is driven sporty, that is, in case the vehicle is running agilely, the current value of the command sportiness index $I_{out}$ is maintained or prevented from being lowered, and the reduction rate Vd thereof is reduced or kept to "0". In this situation, specifically, the command sportiness index $I_{out}$ is reduced at step S7 using the following equation:

$$I_{out}=I_{out}-Vd\cdot d1.$$

To the contrary, in case the integral (or accumulation) of the deviation D is smaller than the reduction starting threshold T so that the answer of step S5 is NO, the routine is returned. That is, the integration of the deviation between the indexes $I_{out}$ and $I_{in}$ is continued.

Meanwhile, in case the answer of step S3 is YES, that is, in case the current value of the instant sportiness index $I_{in}$ is larger than the current command sportiness index $I_{out}$ being maintained, the command sportiness index $I_{out}$ is updated on the basis of the current local maximum value of instant sportiness index $I_{in}$, and a reset of the integral (or accumulation) of the deviation D is executed at the same time (at step S8). The routine is then returned. Such updating of the command sportiness index $I_{out}$ is carried out as explained with reference to FIG. 3.

Thus, FIG. 5 shows the control example to carry out a temporal integration of the deviation between the indexes $I_{out}$ and $I_{in}$ uniformly, in case the value of the instant sportiness index $I_{in}$ is smaller than the command sportiness index $I_{out}$ being maintained. As described, the instant sportiness index $I_{in}$, or a wideness of the deviation between the indexes $I_{out}$ and $I_{in}$ is considered as a medium representing the driving preference or intention of the driver. Therefore, in order to reflect such driver's preference or intention on the control to adjust the driving characteristics of the vehicle more accurately, it is preferable to execute the integration of the deviation between the indexes $I_{out}$ and $I_{in}$ while weighting the instant sportiness index $I_{in}$ being detected or calculated, or weighting the deviation between the indexes $I_{out}$ and $I_{in}$. An example of such control is shown in FIGS. 8 and 9.

Figure 8:
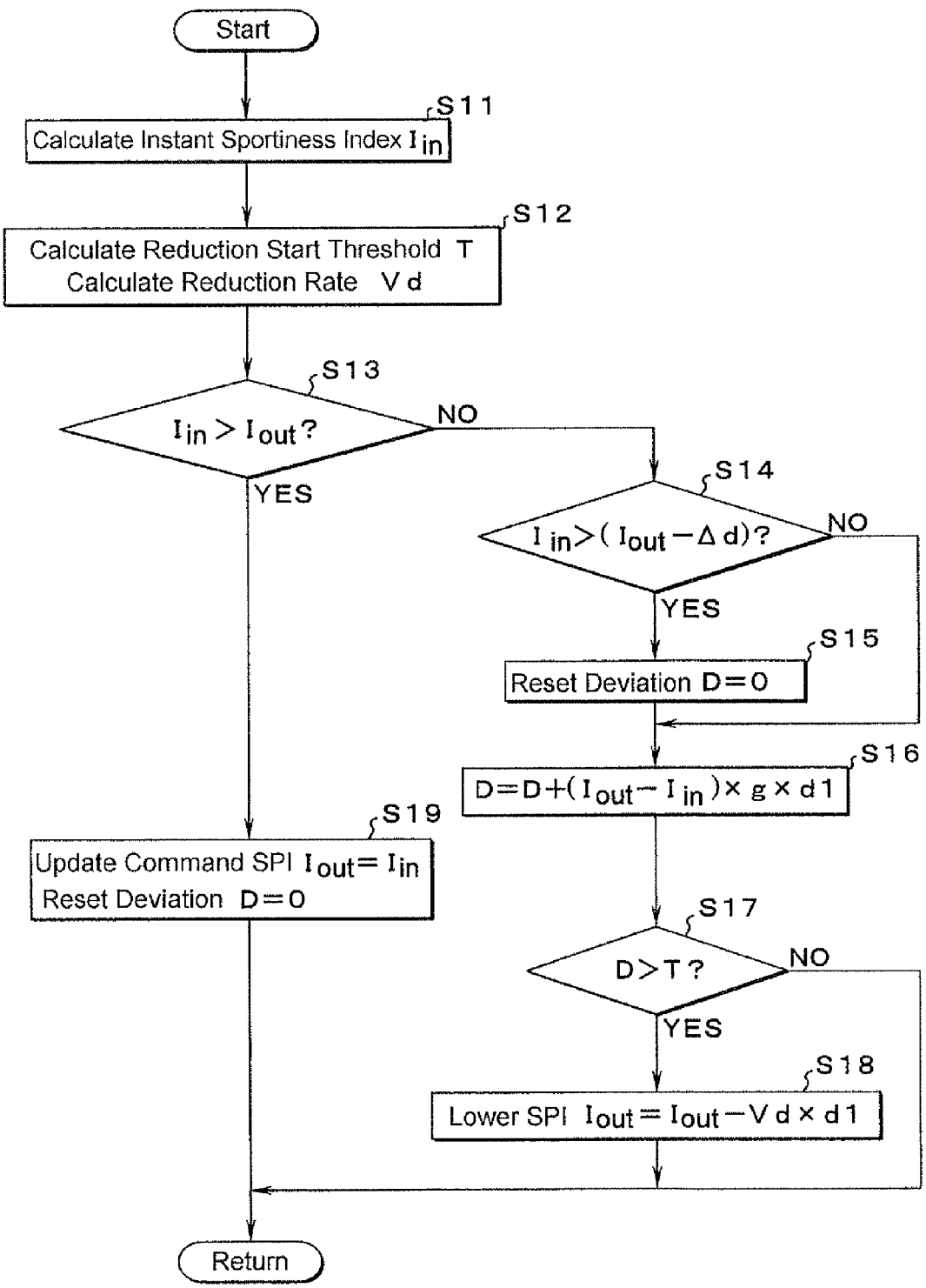
FIG. 8 is a flowchart explaining another control example to be carried out by the vehicle control system of the present invention.
Figure 9:
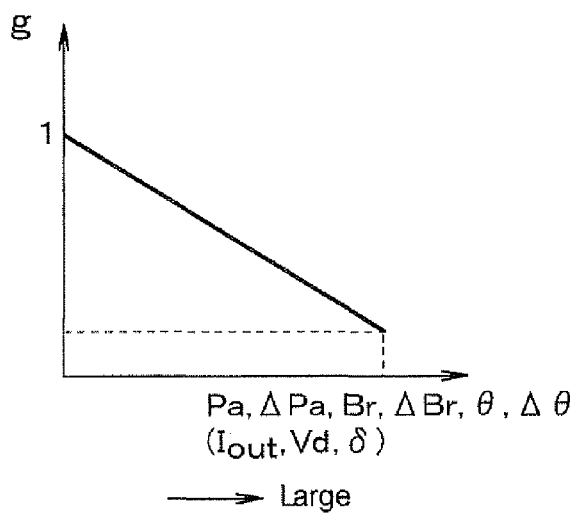
FIG. 9 is an example of a map used to set a gain used in the control shown in FIG. 8.

FIG. 8 is a flowchart explaining the above-explained control example. As the control example shown in FIG. 5, the routine shown in FIG. 8 is carried out repeatedly at predetermined short intervals by turning on the main switch or a starting switch, and the data such as the command sportiness index $I_{out}$ is initialized by turning off any of those switches. According to the control shown in FIG. 8, first of all, the instant sportiness index $I_{in}$ is calculated (at step S11), as the aforementioned step S1 of the example shown in FIG. 5.

Then, the reduction starting threshold T defining a time to start lowering the command sportiness index $I_{out}$ being maintained, and the reduction rate (i.e., percentage or gradient) Vd to lower the command sportiness index $I_{out}$ are calculated individually (at step S12), as the aforementioned step S2 of the example shown in FIG. 5.

Then, it is judged whether or not the current value of the instant sportiness index $I_{in}$ is larger than the current value of the command sportiness index $I_{out}$ (at step S13). In case the answer of step S3 is NO, that is, in case the value of the instant sportiness index $I_{in}$ obtained from the current acceleration of the vehicle is smaller than the current command sportiness index $I_{out}$ being maintained, an assessment of the instant sportiness index $I_{in}$, in other words, an assessment of the current sportiness of the vehicle is carried out (at step S14). Specifically, at step S14, it is judged whether or not the deviation between the command sportiness index $I_{out}$ and the instantسportiness index $I_{in}$ is smaller than a predetermined criterion value Δd. This criterion value Δd is set to a relatively small value. That is, the judgment at step S14 is carried out to determine whether or not the instant sportiness index $I_{in}$ is approximating to the command sportiness index $I_{out}$.

In case the answer of step S14 is YES, it is considered that the sportiness of the running vehicle is similar to the current driving characteristics thereof established on the basis of the command sportiness index $I_{out}$. In this case, therefore, it is unnecessary to lower the command sportiness index I out so that a reset of the integral (or accumulation) of the deviation D is executed (at step S15), and then the integration of the deviation between the indexes $I_{out}$ and $I_{in}$ is carried out (at step S16). To the contrary, in case the deviation between the command sportiness index $I_{out}$ and the instant sportiness index $I_{in}$ is larger than a predetermined criterion value Δd so that the answer of step S14 is NO, the routine advances to step S16 directly while skipping step S15 to carry out the integration of the deviation between the indexes $I_{out}$ and $I_{in}$.

Specifically, at step S16, the deviation between the indexes $I_{out}$ and $I_{in}$ is integrated while weighting the difference between the current instant sportiness index $I_{in}$ and the current command sportiness index $I_{out}$. More specifically, at step S16, the difference between the current instant sportiness index $I_{in}$ and the current command sportiness index $I_{out}$ ($I_{out}-I_{in}$) is multiplied by a predetermined gain g and by the calculation cycle d1, and added to the integral of the deviation D. That is, the gain g serves as a weighting factor, and the gain g may be determined in advance on the basis of parameters representing an operation of the driver, a road condition etc. FIG. 9 shows an example of a map for setting the gain g. As shown in FIG. 9, the gain g is reduced according to an increase in at least one of the following factors such as an opening degree Pa of the accelerator, a change rate ΔPa of the opening degree Pa, a depression of the brake pedal Br, a change rate ΔBr of the depression of the brake pedal Br, a steering angle θ, and a change rate Δθ of the steering angle θ, a value of the current command sportiness index $I_{out}$, the aforementioned reduction rate Vd, a road gradient δ and so on. That is, even if the current instant sportiness index $I_{in}$ is smaller than the current command sportiness index $I_{out}$, the integral of the deviation D as a condition to lower the command sportiness index $I_{out}$ is prevented from being increased in case the vehicle is running under the condition similar to the driving characteristics established on the basis of the command sportiness index $I_{out}$. In this case, therefore, a commencement to lower the command sportiness index $I_{out}$ is delayed relatively.

The integral (or accumulation) of the deviation D thus obtained is then compared with the reduction starting threshold T calculated at step S12 (at step S17). Specifically, at step S17, it is judged whether or not the integral (or accumulation) of the deviation D is larger than the reduction starting threshold T. That is, step S17 is a step for judging a satisfaction of the aforementioned "another condition". In case the answer of step S17 is YES, the command sportiness index $I_{out}$ is lowered gradually at the reduction rate Vd calculated at step S12 (at step S18). Thus the control similar to the aforementioned step S7 in FIG. 5 is carried out at step S18. In this case, a reset of the integral of the deviation D may be executed.

In case the integral (or accumulation) of the deviation D is smaller than the reduction starting threshold T so that the answer of step S17 is NO, the routine is returned. That is, the integration (or accumulation) of the deviation between the indexes $I_{out}$ and $I_{in}$ is continued.

Meanwhile, in case the answer of step S13 is YES, that is, in case the current value of the instant sportiness index $I_{in}$ is larger than the current command sportiness index $I_{out}$ being maintained, the command sportiness index $I_{out}$ is updated on the basis of the current local maximum value of instant sportiness index $I_{in}$, and a reset of the integral (or accumulation) of the deviation D is executed (at step S19). The routine is then returned. Such updating of the command sportiness index $I_{out}$ is carried out as explained with reference to FIG. 3.

Thus, according to the control shown in FIG. 8, the deviation between the instant sportiness index $I_{in}$ changing momentarily and the command sportiness index I out is assessed, and such assessment is used as the condition to lower the instant sportiness index $I_{in}$. Therefore, according to the control shown in FIG. 8, the driver's preference or intention can be reflected on the control to adjust the driving characteristics of the vehicle more accurately.

As described, the vehicle control system according to the present invention is configured to determine the index on the basis of the acceleration, and the driving characteristics of the vehicle is set on the basis of the index. As also described, both of the actual acceleration detected by the acceleration sensor, and the estimated (or target) acceleration calculated on the basis of a drive demand, a vehicle speed, an operating amount of the brake a steering angle etc. may be used to obtain the above-mentioned index. Alternatively, it is also possible to determine the index based on a combination of the actual acceleration and the target acceleration. In case of using both of the actual acceleration and the target acceleration to determine the index, the index is individually obtained on the basis of the actual acceleration and the target acceleration. The indexes thus obtained are compared to each other, and one of those indexes possible to set sportier driving characteristics of the vehicle is used in the control set the driving characteristics of the vehicle. In this case, for example, an actual instant sportiness index $I_{in}$ is determined on the basis of the actual acceleration, and an actual command sportiness index $I_{out}$ is determined on the basis of the actual instant sportiness index $I_{in}$. Meanwhile, a target instant sportiness index $I_{in}$ is determined on the basis of the target acceleration, and a target command sportiness index $I_{out}$ is determined on the basis of the target instant sportiness index $I_{in}$. Then, one of the larger indexes of the actual command sportiness index $I_{out}$ and the target command sportiness index $I_{out}$ thus obtained is used to set the driving characteristics of the vehicle. A relation between the command sportiness index $I_{out}$ and the driving characteristics of the vehicle will be explained later.

Figure 10:
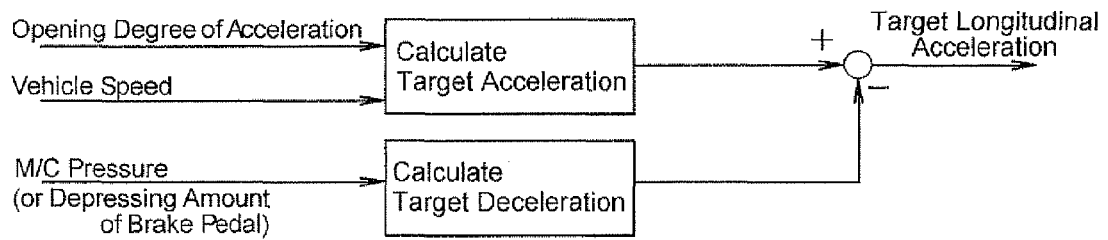
FIG. 10 is a block diagram showing a control for calculating target acceleration and target deceleration on the basis of an opening degree of an accelerator, a vehicle speed, and M/C pressure or depressing amount of a brake pedal.

The target acceleration can be calculated by various ways, and an example to calculate the target acceleration will be explained hereinafter. First of all, the target acceleration in the longitudinal direction is to be explained. The longitudinal acceleration of the vehicle can be obtained on the basis of a target acceleration and a target deceleration, and for example, the target acceleration can be calculated on the basis of a drive demand such as an opening degree of the accelerator and a vehicle speed. On the other hand, the deceleration is established by a braking operation. Therefore, the target deceleration can be calculated on the basis of a pressure of a brake master cylinder (M/C) governed by an operation of the brake (M/C pressure), and a depressing amount of the brake pedal. Correlation of those factors is shown in block diagram of FIG. 10.

Figure 11:
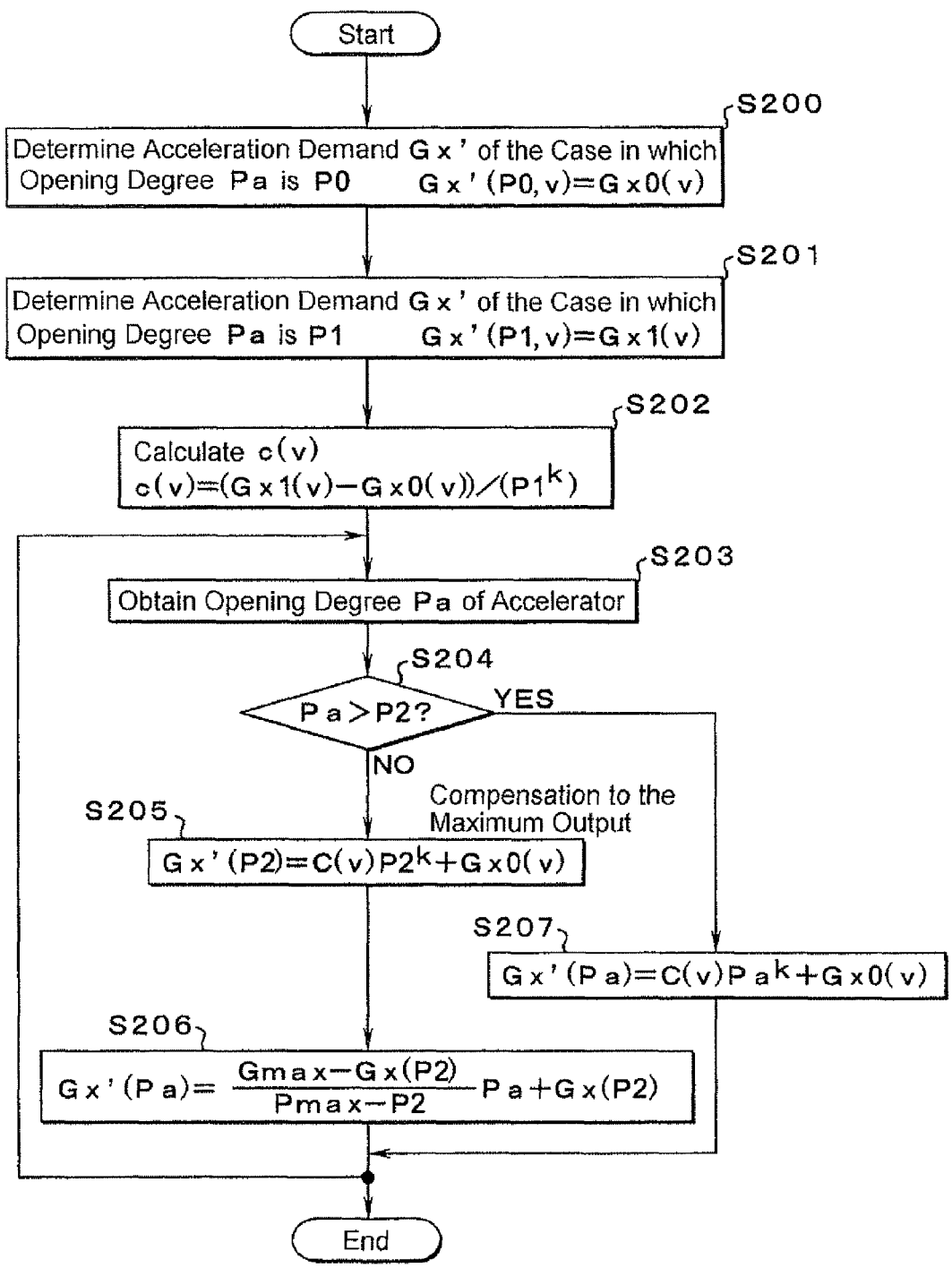
FIG. 11 is a flowchart explaining a control example for calculating the target acceleration.

In order to obtain the target acceleration (i.e., an acceleration demand) on the basis of the opening degree of the accelerator and the vehicle speed, a calculation procedure shown in FIG. 11 is carried out. First of all, acceleration demand Gx' of a case in which the accelerator is fully closed (i.e., in case the opening degree Pa=P0) is determined (at step S200), and the acceleration demand Gx' of this case can be expressed by the following formula:

$$Gx'(P0,v)=Gx0(v).$$

Specifically, the acceleration demand Gx' of this case can be calculated with reference to a map prepared in advance.

Then, acceleration demand Gx' of a case in which the opening degree Pa of the accelerator is a predetermined value (Pa=P1) is determined (at step S201), and the acceleration demand Gx' of this case can be expressed by the following formula:

$$Gx'(P1,v)=Gx1(v).$$

Specifically, the acceleration demand Gx' of this case can be calculated with reference to a map prepared in advance.

Based on the acceleration demands Gx1(v) and Gx0(v) thus determined, a constant c(v) to be used to calculate acceleration demand under the condition in which the opening degree Pa of the accelerator is "P0<Pa<P1" at a desired Weber fraction is calculated (at step S202) using the following formula:

$$c(v)=(Gx1(v)-Gx0(v))/P1^k$$

where k represents Weber fraction or corrected Weber fraction. That is, k represents a fraction of a decision threshold with respect to a basic stimulus according to Weber's low which states that the just-noticeable difference between two stimuli is proportional to the magnitude of the stimuli.

Then, an opening degree Pa of the accelerator is obtained (at step S203), and it is judged whether or not the obtained opening degree Pa of the accelerator is larger than the maximum opening degree P2 of the accelerator to which Weber's low is applied (at step S204). In case the answer of step S204 is NO, a compensation of the acceleration demand to the maximum output is carried out (at step S205). For example, such compensation is carried out using the following formula:

$$Gx'(P2)=c(v)P2^k+Gx0(v).$$

Then, target acceleration Gx'(Pa) of the case in which the opening degree of the accelerator is Pa is calculated using the following formula:

$$Gx'(Pa)=[\{(Gmax-Gx(P2))Pa\}/(Pmax-P2)]+Gx(P2)$$

(at step S206).

To the contrary, in case the answer of step S204 is YES, the target acceleration Gx'(Pa) is calculated using Weber-Fechner law (at step S207). Specifically, the target acceleration Gx'(Pa) of this case is calculated using the following formula:

$$Gx'(Pa)=c(v)Pa^k+Gx0(v).$$

After the calculation at step S206 or S207, the routine is returned to step S203 to repeat the controls to step S206 or to step S207 while the vehicle is running or the main switch is being turned on.

Figure 12:
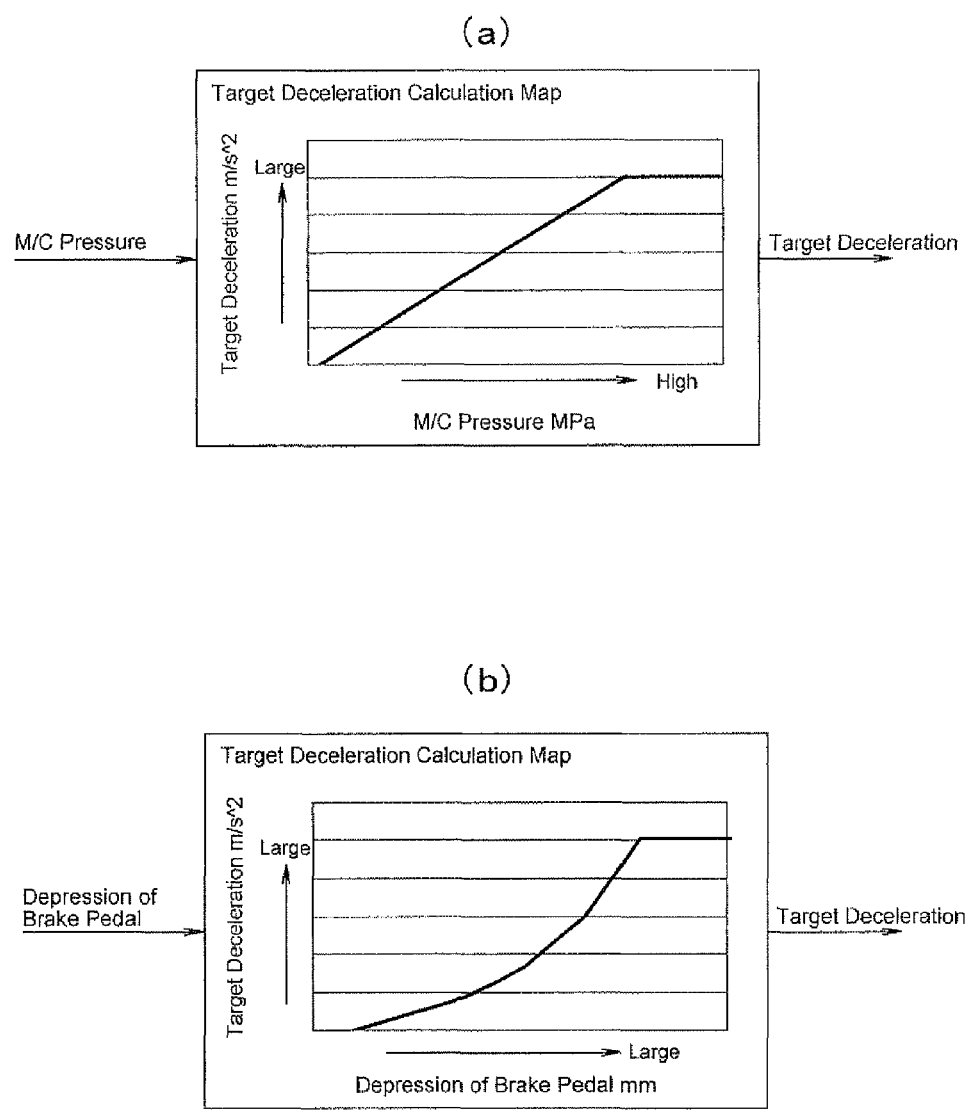
FIG. 12 (a) is a map for calculating the target deceleration on the basis of the M/C pressure, and FIG. 12 (b) is a map for calculating the target deceleration on the basis of a depression of the brake pedal.

Meanwhile, the target deceleration can be obtained on the basis of the aforementioned M/C pressure, a depression of the brake pedal and so on. Specifically, the target deceleration can be calculated with reference to a map determining a relation between the target deceleration and those parameters. Examples of the maps prepared in advance based on an experimental result or a simulation are shown in FIGS. 12 (a) and (b).

Examples of the estimated acceleration which can be used in the control of the present invention are listed as follows. For example, any of the following derivative values such as, a derivative value of an input speed of the transmission (T/M) 13, a derivative value of an output speed of the transmission (T/M) 13, and a derivative value of a drive shaft, may be used as the longitudinal acceleration. Alternatively, the longitudinal acceleration may also be obtained on the basis of information about a positional change of the vehicle collected by a GPS (Global Positioning System).

In addition, the longitudinal acceleration Gx may also be obtained on the basis of a change in a vertical load in the longitudinal direction. For example, provided that there is no pavement irregularity, the longitudinal acceleration Gx of the front wheel can be calculated using the following formula:

$$Gx=-((Fzfr-Fzfr0)+(Fzfl-Fzfl0))\cdot(L/(M\cdot H));$$

and the longitudinal acceleration Gx of the rear wheel can be calculated using the following formula:

$$Gx=-((Fzrr-Fzrr0)+(Fzrl-Fzrl0))\cdot(L/(M\cdot H));$$

where "M" represents a weight of the vehicle, "h" represents a height of gravitational center, "L" represents a wheel base, "Fz" represents a dynamic vertical load, "Fz0" represents a static vertical load, a first suffix "r" represents the rear wheel, a first suffix "f" represents the front wheel, a second suffix "r" represents the right wheel, and a second suffix "l" represents the left wheel.

Meanwhile, the lateral acceleration Gy may be obtained from at least any of a change in a vertical load, a steering angle, a yaw rate and so on. For example, provided that there is no pavement irregularity, the lateral acceleration Gy of the front wheel can be calculated using the following formula:

$$Gy=((Fzfr-Fzfr0)-(Fzfl-Fzfl0))\cdot(T/(2\cdot M\cdot h\cdot Rsf));$$

and the lateral acceleration Gy of the rear wheel can be calculated using the following formula:

$$Gy=((Fzrr-Fzrr0)-(Fzrl-Fzrl0))\cdot(T/(2\cdot M\cdot h\cdot(1-Rsf));$$

where "Rsf" represents a roll stiffness distribution, "M" represents a weight of the vehicle, "h" represents a height of gravitational center, "T" represents a tread, "Fz" represents a dynamic vertical load, "Fz0" represents a static vertical load, a first suffix "r" represents the rear wheel, a first suffix "f" represents the front wheel, a second suffix "r" represents the right wheel, and a second suffix "l" represents the left wheel.

Alternatively, the lateral acceleration Gy may be calculated on the basis of the steering wheel angle St using the following formula:

$$Gy=(St/nl)\cdot\{V^2/(1+AV^2)\}$$

where "n" represents a steering gear ratio, "l" represents a wheel base, "A" represents a stability factor, and "V" represents a vehicle speed.

In addition, the lateral acceleration Gy may also be obtained from a yaw rate Yr. In this case, the lateral acceleration Gy may be expressed by the following expression:

$$Gy=Yr\cdot V.$$

Therefore, the lateral acceleration Gy can be calculated by detecting the yaw rate Yr by a sensor, and substituting the detected value into the above formula. As described, the positional information of the vehicle may be obtained from the GPS. Therefore, it is also possible to obtain the lateral acceleration Gy using the GPS as the case of calculating the longitudinal acceleration Gx.

Thus, the instant sportiness index $I_{in}$ is calculated on the basis of the aforementioned actual acceleration or estimated acceleration. As described, the command sportiness index $I_{out}$ is determined on the basis of the instant sportiness index $I_{in}$. The command sportiness index $I_{out}$ thus determined represents the driving condition of the vehicle, and the driving condition of the vehicle includes a driving environment such as a road gradient, an existence of a corner, a curvature of the corner etc., and a driving preference of the driver. That is, the acceleration of the vehicle is changed depending on the road condition, and the acceleration of the vehicle is also changed by the accelerating and decelerating operation of the driver carried out in accordance with the road condition. Therefore, the vehicle control system according to the present invention is configured to utilize the command sportiness index I out in the control to adjust the driving characteristics of the vehicle. Specifically, according to the present invention, the driving characteristics of the vehicle include characteristics of the acceleration, steering, suspension, sound and etc. Those characteristics are set arbitrarily by changing characteristics of the throttle valve 10, the transmission 13, the shock absorber 5 of the suspension 4, the assist mechanism 18 and so on by the actuators of those devices. Basically, the sportiness of vehicle is enhanced according to an increase of the command sportiness index $I_{out}$.

Figure 13:
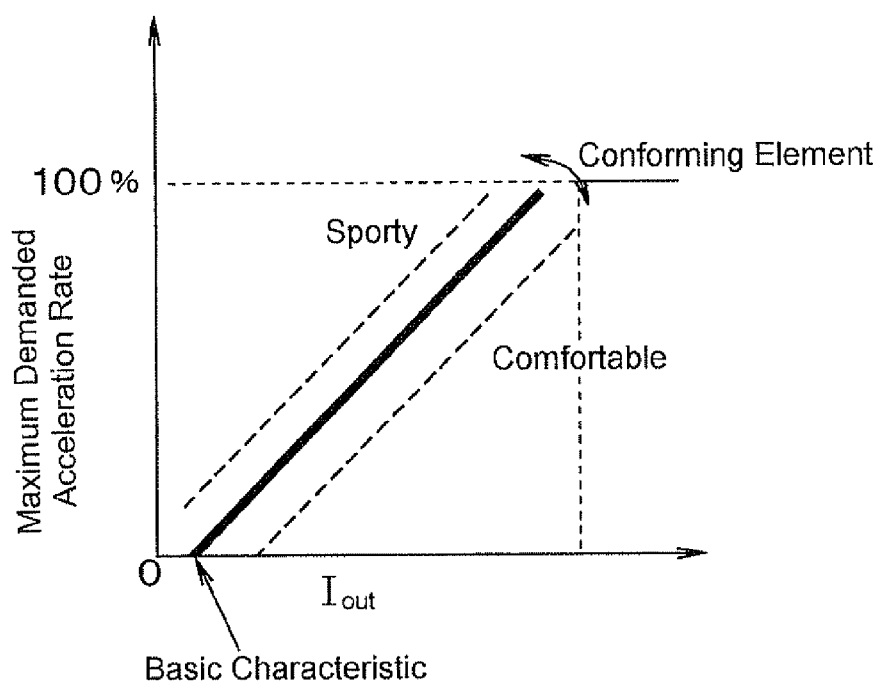
FIG. 13 is a map showing a relation between the command sportiness index and a maximum demanded acceleration rate.

Here will be explained an example to change the driving characteristics of the vehicle by changing the acceleration of the vehicle according to the command sportiness index $I_{out}$. In this case, a maximum demanded acceleration rate is obtained in accordance with the command sportiness index $I_{out}$, and an example to obtain the maximum demanded acceleration rate is shown in FIG. 13. Specifically, the maximum demanded acceleration rate represents an available driving force capacity of the vehicle. For example, in case the maximum demanded acceleration rate is 100%, the vehicle is in condition to produce maximum acceleration thereof. In this situation, meanwhile, the transmission 13 is in condition to set a speed change ratio to raise the engine speed to the maximum speed, or to set the largest speed change ratio (i.e., the speed change ratio of the lowest speed side). In case the maximum demanded acceleration rate is 50%, the vehicle is in condition to produce half of available acceleration thereof, and the transmission 13 is in condition to set an intermediate speed change ratio. As indicated in the example shown in FIG. 13, the maximum demanded acceleration rate is increased according to an increase in the command sportiness index $I_{out}$. In FIG. 13, basic characteristic of the vehicle is indicated by a solid line. The basic characteristic of the vehicle indicated in FIG. 13 was obtained by calculating a relation between the command sportiness index $I_{out}$ and the maximum demanded acceleration rate on the basis of data obtained from a driving test of the vehicle, while making appropriate modifications on the basis of the driving test and a simulation of driving the vehicle. In case of setting a characteristic line in a region where the maximum demanded acceleration rate is higher than the basic characteristics, the acceleration of the vehicle is increased relatively. Therefore, in this case, acceleration of the vehicle is increased so that the sportiness of the driving characteristics is enhanced. To the contrary, in case of setting the characteristic line in a region where the maximum demanded acceleration rate is lower than the basic characteristics, the acceleration of the vehicle is decreased relatively. Therefore, in this case, the driving characteristics and acceleration of the vehicle are moderated so that the riding comfort of the vehicle is improved. Those adjustments (i.e., adaptation or tuning) may be carried out depending on required character of the vehicle as a commodity. In addition, in order to exclude an extremely low speed range from the control to set or adjust the driving characteristics of the vehicle, for example, in order to exclude the situations in which the vehicle is involved in a traffic jam, or in which the vehicle is driven backwardly into a garage from the above-mentioned control, the basic characteristic is set in a manner to set the maximum demanded acceleration rate to zero under the situation where the command sportiness index $I_{out}$ is larger than zero.

Figure 14:
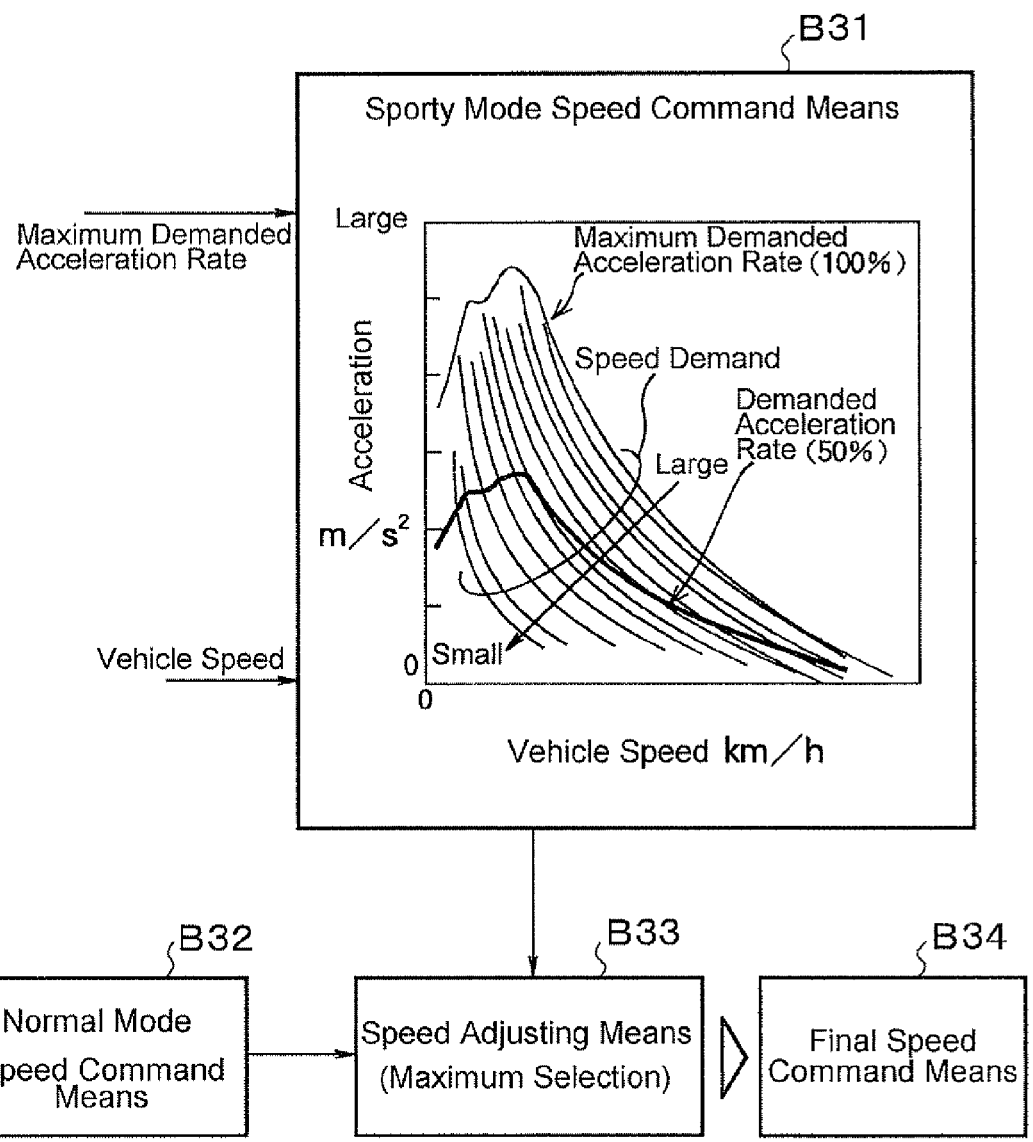
FIG. 14 is a view showing a relation between the vehicle speed and the acceleration, in which the maximum demanded acceleration rate based on the command sportiness index is added, together with showing a procedure for calculating a final command speed.

Here will be explained an example of a control to change the acceleration of the vehicle while reflecting the above-explained maximum demanded acceleration rate on a speed change characteristics of the transmission 13. In a vehicle using a continuously variable transmission as the transmission 13, or in a hybrid vehicle configured to control the engine speed by motor, a target output is calculated on the basis of a vehicle speed and a drive demand, and the engine speed is controlled to output the calculated target output. FIG. 14 shows a relation between the vehicle speed and the acceleration with respect to a speed demand, and the maximum demanded acceleration rate obtained on the basis of the command sportiness index $I_{out}$ with reference to FIG. 13 is added in FIG. 14. Specifically, a thick line representing the maximum demanded acceleration rate of 100%, and a thick line representing the maximum demanded acceleration rate of 50% are added in FIG. 14. Accordingly, in FIG. 14, the demanded speed is indicated at an intersection of the line representing the maximum demanded acceleration rate and a line representing the current vehicle speed.

In order to control the speed change ratio set by the transmission 13, the vehicle having the transmission 13 as explained with reference to FIG. 24 is provided with a basic speed change map. For example, in case the transmission 13 is a continuously variable transmission, the speed change ratio is set with reference to the map where the speed change ratio is determined in accordance with the vehicle speed and the engine speed. Generally, such speed change control is known as a torque demand control. According to the torque demand control, first of all, the drive demand is obtained with reference to a driving force map in which the driving force is determined on the basis of the opening degree of the accelerator and the vehicle speed, and an output demand of the engine is obtained on the basis of the drive demand thus obtained and the vehicle speed or the engine speed. Then, a target engine speed to output the demanded output of the engine at the optimum fuel economy is obtained with reference to an engine speed map, and the speed change ratio of the continuously variable transmission is controlled to achieve the target engine speed. That is, in this case, the transmission 13 is used as a speed control mechanism for controlling the speed of the engine functioning as the prime mover. Here, an output of the engine is obtained by multiplying the torque and the speed. Therefore, the engine torque to achieve the output demand is obtained on the basis of the target engine speed or a vehicle speed corresponding thereto, and an opening degree of the throttle valve to achieve the engine torque is calculated.

Specifically, a sporty mode speed command means B31 shown in FIG. 14 serves as a sporty speed calculation means for outputting the speed demand obtained on the basis of the command sportiness index $I_{out}$. Meanwhile, a normal mode speed command means B32 serves as a normal speed calculation means for outputting the target speed obtained by the normal engine speed control such as the aforementioned torque demand control. Those normal mode speed and the sporty mode speed thus calculated are compared (i.e., adjusted) by a speed adjusting means B33, and a higher speed is selected. That is, a maximum selection is executed by the speed adjusting means B33. The selected speed is outputted by a final speed command means B34 in the form of a control signal. Therefore, in case the opening degree of the accelerator is small so that the normal mode speed is lower than the sporty mode speed, the sporty mode speed is maintained. Meanwhile, in case the accelerator pedal is depressed deeply so that the drive demand is increased to exceed the maximum demanded acceleration rate, a downshifting is carried out.

That is, the above-explained control is a speed change control of the continuously variable transmission to set the speed change ratio of the low speed side (i.e., to set the large speed change ratio). As a result of thus increasing the speed change ratio, the maximum driving force or the engine braking force is increased so that the vehicle can be controlled agilely. That is, the driving characteristics of the vehicle can be adjusted to enhance the sportiness according to the driving preference of the driver or according to a driving environment such as a road condition. For example, the above-explained control of the vehicle having the continuously variable transmission may be carried out in case the vehicle is provided with a mode selecting switch and the sporty mode is selected by the mode selecting switch.

Figure 15:
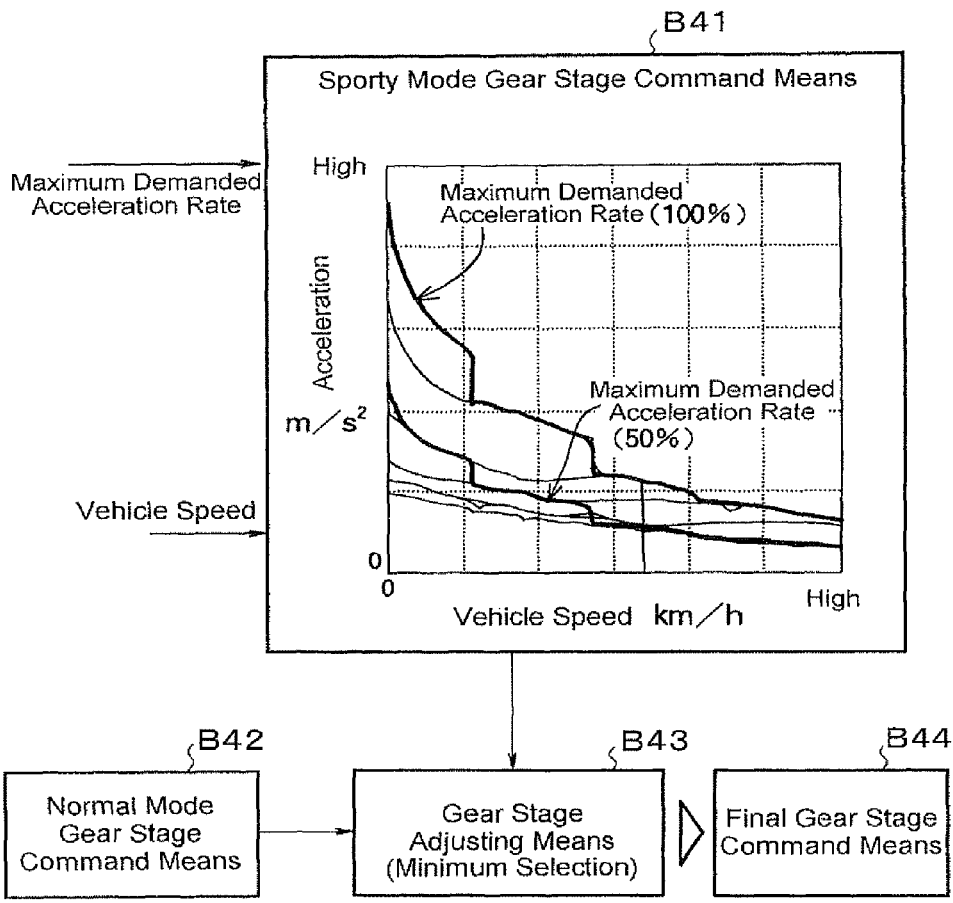
FIG. 15 is a view showing a relation between the vehicle speed and the acceleration, in which the maximum demanded acceleration rate based on the command sportiness index is added, together with showing a procedure for calculating a final gear stage.

Meanwhile, in case the transmission 13 is a geared transmission, a control shown in FIG. 15 is carried out. In case of carrying out a shift control of the geared transmission, a target gear stage is determined and control signal is outputted to the actuator of the transmission 13 to set the target gear stage. Relations between the vehicle speed and the acceleration under each gear stage are as shown in FIG. 15. In FIG. 15, a thick line representing the maximum demanded acceleration rate of 100%, and a thick line representing the maximum demanded acceleration rate of 50% obtained on the basis of the command sportiness index $I_{out}$ are also added. In this case, therefore, the gear stage closest to an intersection between the line representing the maximum demanded acceleration rate obtained on the basis of the command sportiness index $I_{out}$ and the line representing the current vehicle speed is determined as the target gear stage.

In case the vehicle control system of the present invention is carrying out the control, a sports target gear stage determined with reference to FIG. 15 and a normal target gear stage (e.g., the speed change ratio determined on the basis of the accelerating operation and the vehicle speed) are compared (i.e., adjusted), and the gear stage of the low speed side where the speed change ratio is larger than that of the other gear stage is selected. That is, a minimum selection is executed. As a result, the speed change ratio is increased thereby increasing the maximum driving force or the engine braking force. Therefore, the vehicle can be controlled agilely also in this case. Specifically, the normal target gear stage is determined with reference to a shifting diagram (i.e., a sped change map) in which a region of each gear stages is defined on the basis of the drive demand such as the opening degree of the accelerator and the vehicle speed. For example, a downshifting is carried out in case the accelerator pedal is depressed deeply so that the drive demand is increased to exceed the maximum demanded acceleration rate, and an upshifting is allowed to be carried out when the vehicle speed is further increased.

Specifically, a sporty mode gear stage command means B41 shown in FIG. 15 is adapted to output the gear stage determined on the basis of the command sportiness index $I_{out}$. Meanwhile, a normal mode gear stage command means B42 is adapted to output the gear stage determined with reference to the normal shifting diagram in which the gear stages are defined on the basis of the opening degree of the accelerator and the vehicle speed. Those normal mode gear stage and the sporty mode gear stage thus determined are compared (i.e., adjusted) by a gear stage adjusting means B43, and the gear stage of the low speed side (where the speed change ratio is larger) is selected. That is, a minimum selection is executed by the gear stage adjusting means B43. The gear stage thus selected is outputted by a final gear stage command means B44 in the form of a control signal. Thus, the transmission 13 is used as a speed control mechanism for controlling the speed of the engine functioning as the prime mover. Therefore, in case the normal mode gear stage is higher than the sporty mode gear stage depending on the opening degree of the accelerator, the sporty mode gear stage is maintained thereby keeping the gear stage to the low speed side (to keep the larger speed change ratio).

That is, the above-explained control is a shift control of the geared transmission to set the gear stage of the low speed side (i.e., to set the large speed change ratio). As a result of thus increasing the speed change ratio, the maximum driving force or the engine braking force is increased so that the vehicle can be controlled agilely. That is, the sportiness of the driving characteristics can be enhanced according to the driving preference of the driver or according to a driving environment such as a road condition. For example, the above-explained control may be allowed to be carried out in case the sporty mode is selected by the mode selecting switch, and inhibited in case the sporty mode is not selected by the mode selecting switch.

Here, the functional means shown in FIGS. 14 and 15 may be installed in the aforementioned electronic control unit 28. Alternatively, those functional means shown in FIGS. 14 and 15 may be installed in another electronic control unit dedicated to carry out the sporty mode control.

Figure 16:
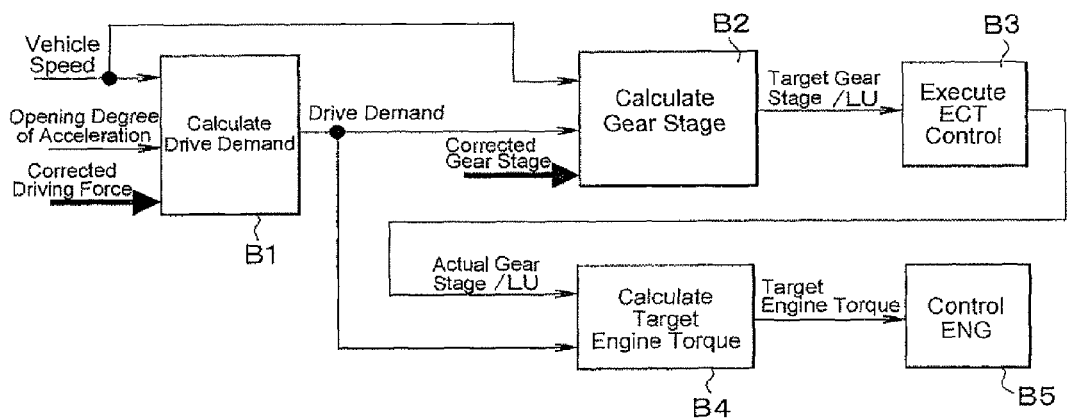
FIG. 16 is a block diagram showing a control of the vehicle having a geared transmission, for reflecting a corrected gear stage and a corrected driving force obtained on the basis of the command sportiness index on the controls for the shifting operation and engine output.

Next, here will be explained a control carried out by the vehicle control system of the present invention for changing the driving characteristics of the vehicle having the engine functioning as the prime mover and the geared transmission while correcting the gear stage and the driving force. FIG. 16 is a block diagram showing a basic example of determining the target gear stage and the target engine torque on the basis of the drive demand. As shown in FIG. 16, first of all, the drive demand is calculated on the basis of the vehicle speed and the opening degree of the accelerator (at block B1). Specifically, the drive demand is determined on the basis of the weight of the vehicle, an output performance of the vehicle and so on. Therefore, at block B1, the drive demand is calculated with reference to a map prepared in advance in which the drive demand is determined in accordance with the vehicle speed and the opening degree of the accelerator. Then, a gear stage is calculated on the basis of the calculated drive demand (at block B2). Specifically, a shifting operation of the geared transmission is carried out with reference to a shifting diagram in which regions of each gear stages, or an upshift line and a downshift line is/are determined using the opening degree of the accelerator and the vehicle speed as parameters. Therefore, the calculation at block B2 is executed with reference to the shifting diagram thus configured. The target gear stage thus calculated is transmitted to a transmission control unit (ECT) in the form of command signal (at block B3), and the shifting operation is carried out. In this situation, if a lockup clutch (LU) is arranged on a power transmission route of the vehicle 1, an actuation of the lockup clutch is judged with reference to a map prepared in advance, and a command signal for engaging or disengaging the lockup clutch is also outputted.

Meanwhile, a target engine torque is calculated on the basis of the drive demand calculated at block B1 and the actual gear stage of the transmission 13 (at block B4). Specifically, the engine speed is determined on the basis of the gear stage and the vehicle speed, therefore, the target engine torque can be calculated on the basis of the engine speed and the drive demand. Then, the engine (ENG) 8 is controlled to generate the engine torque thus calculated (at block B5). Specifically, an opening degree of the throttle valve is controlled.

As described, according to the vehicle control system of the present invention, the command sportiness index $I_{out}$ is changed on the basis of the instant sportiness index $I_{in}$ obtained from the longitudinal acceleration Gx, the lateral acceleration Gy or the synthesized acceleration of those accelerations, and the maximum demanded acceleration rate is changed according to the change in the command sportiness index $I_{out}$. As explained with reference to FIG. 15, the maximum demanded acceleration rate is reflected on the shifting control, and if the gear stage determined on the basis of the command sportiness index $I_{out}$ is lower than the gear stage of the normal mode, the lower gear stage is determined as the final gear stage. Meanwhile, the basic example explained with reference to FIG. 16 is configured to carry out the shifting operation under the normal mode. Therefore, if the final gear stage determined on the basis of the command sportiness index $I_{out}$ is the gear stage of low speed side, the final gear stage thus determined is inputted at the aforementioned block B2 to be used as the target gear stage. As a result, a relatively large speed change ratio is established and the maximum driving force or the engine braking force is thereby increased. Therefore, the vehicle can be controlled agilely, that is, the sportiness of the driving characteristics can be enhanced according to the driving preference of the driver or according to a driving environment such as a road condition.

Alternatively, the acceleration of the vehicle may also be adjusted on the basis of the command sportiness index $I_{out}$ by adjusting the output of the engine 8. In this case, a corrected driving force is inputted at block B1, and the drive demand calculated by the basic control is changed on the basis of the corrected driving force. Here, the corrected driving force is determined on the basis of the command sportiness index $I_{out}$. For this purpose, data is collected by carrying out a driving test or a simulation based on the driver's intention, and the collected data is used to prepare a map determining a relation between the command sportiness index $I_{out}$ and the corrected driving force. Therefore, the corrected driving force may also be obtained on the basis of the command sportiness index $I_{out}$ obtained while driving the vehicle and the corrected driving force map thus prepared.

Figure 17:
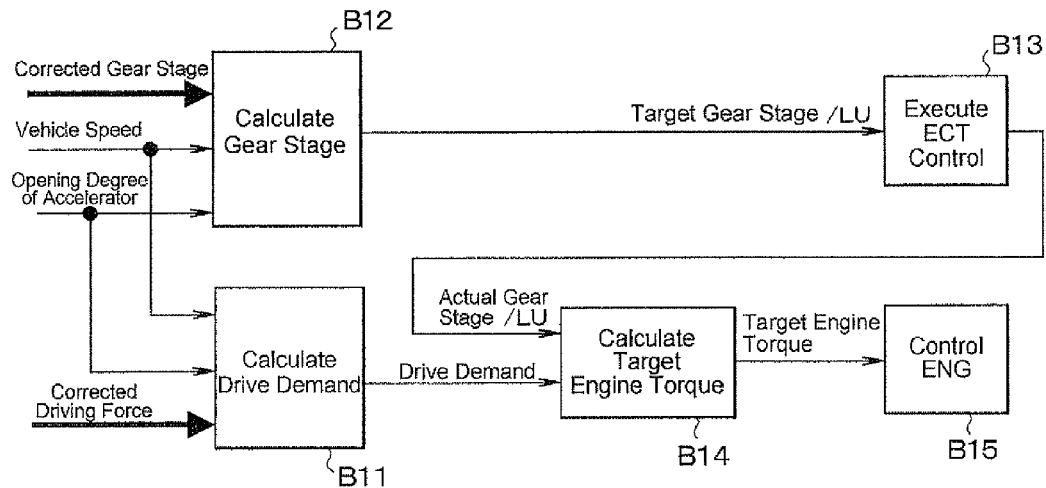
FIG. 17 is a block diagram showing another control of the vehicle having a geared transmission, for reflecting a corrected gear stage and a corrected driving force obtained on the basis of the command sportiness index on the controls for the shifting operation and engine output.

FIG. 17 is a block diagram showing an example to determine the gear stage in parallel with the drive demand on the basis of the vehicle speed and the opening degree of the accelerator. As described, the gear stage of the geared transmission is controlled with reference to the shifting diagram in which the gear stages, or an upshift line and a downshift line is/are determined on the basis of the opening degree of the accelerator and the vehicle speed. Therefore, first of all, the gear stage is calculated on the basis of the vehicle speed and the opening degree of the accelerator (at block B12), and at the same time, the drive demand is calculated also on the basis of the vehicle speed and the opening degree of the accelerator (at block B11). That is, the calculation of the driving force executed at block B11 is identical to the calculation executed at block B1 of the example shown in FIG. 16.

The target gear stage thus calculated at block B12 is transmitted to the transmission control unit (ECT), and the shifting operation of the transmission 13 is carried out (at block B13). In this situation, if a lockup clutch (LU) is arranged on a power transmission route of the vehicle 1, an actuation of the lockup clutch is judged with reference to a map prepared in advance, and a command signal for engaging or disengaging the lockup clutch is also outputted.

Meanwhile, a target engine torque is calculated on the basis of the drive demand calculated at block B11 and the actual gear stage of the transmission 13 (at block B14), and the engine (ENG) 8 is controlled to generate the engine torque thus calculated (at block B15). Thus, the control carried out at block B14 is identical to the control carried out at block B4 in FIG. 16, and the control carried out at block B15 is identical to the control carried out at block B5 in FIG. 16.

According to the example shown in FIG. 17, if the final gear stage determined on the basis of the command sportiness index $I_{out}$ is the gear stage of the low speed side, the final gear stage thus determined is also inputted at the aforementioned block B12 to be used as the target gear stage. As a result, a relatively large speed change ratio is established and the acceleration of the vehicle is thereby enhanced. In this case, the corrected drive force determined on the basis of the command sportiness index $I_{out}$ is also inputted at block B11, and the drive demand calculated by the basic control is changed on the basis of the corrected drive force.

Figure 18:
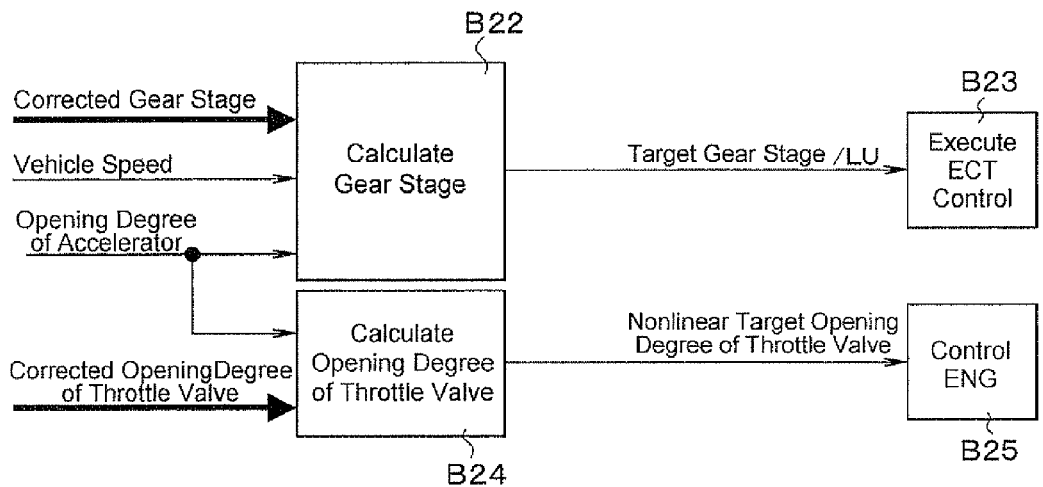
FIG. 18 is a block diagram showing still another control of the vehicle having a geared transmission, for reflecting a corrected gear stage and a corrected driving force obtained on the basis of the command sportiness index on the controls for the shifting operation and engine output.

FIG. 18 is a block diagram showing an example to control the transmission 13 and the engine 8 separately on the basis of the vehicle speed and the opening degree of the accelerator. In this case, first of all, the gear stage is calculated on the basis of the vehicle speed and the opening degree of the accelerator (at block B22). The target gear stage thus calculated at block B22 is transmitted to the transmission control unit (ECT), and the shifting operation of the transmission 13 is carried out (at block B23). Those controls are identical to the controls carried out at blocks B12 and B13 of the example shown in FIG. 17. On the other hand, the opening degree of the throttle valve is calculated on the basis of the opening degree of the accelerator (at block B24), and then, the engine S is controlled on the basis of the target opening degree of the throttle valve thus calculated (at block B25). In case the throttle valve is an electronic throttle valve, a relation between the opening degree of the accelerator and the target opening degree of the throttle valve is set basically nonlinearly. Specifically, in case the opening degree of the accelerator is relatively small, an amount of change in the opening degree of the throttle valve with respect to an amount of change in the opening degree of the accelerator is relatively small. To the contrary, in case the opening degree of the accelerator is relatively large, a relation between the amount of change in the opening degree of the accelerator and the amount of change in the opening degree of the throttle valve becomes approximately one to one.

According to the example shown in FIG. 18, if the final gear stage determined on the basis of the command sportiness index $I_{out}$ is the gear stage of the low speed side, the final gear stage thus determined is also inputted at the aforementioned block B22 to be used as the target gear stage. As a result, a relatively large speed change ratio is established and the acceleration of the vehicle is thereby enhanced. In this case, a corrected opening degree of the throttle valve determined on the basis of the command sportiness index $I_{out}$ is inputted at block B24, and the target opening degree of the throttle valve obtained by the aforementioned basic example is changed on the basis of the corrected opening degree of the throttle valve. That is, the output characteristic of the prime mover with respect to the operation of the accelerator may also be changed (to increase the output) in case the command sportiness index $I_{out}$ is increased.

As described, the synthesized acceleration of the vehicle is increased according to the intention of the driver, for example, the synthesized acceleration is increased in case the accelerator pedal 12 is depressed to accelerate the vehicle, in case the brake pedal 7 is depressed to decelerate the vehicle, or in case the steering wheel 16 is rotated to turn the vehicle. According to the vehicle control system of the present invention, the command sportiness index $I_{out}$ is increased immediately in accordance with the increase in the synthesized acceleration. As a result, the available driving force capacity is increased according to the increase in the command sportiness index $I_{out}$, and the demanded acceleration is thereby generated immediately. Consequently, the sportiness of the driving characteristics of the vehicle is enhanced. In addition, the above-mentioned operations of the driver are basically carried out depending on the driving environment such as a gradient of the road. Therefore, the driver's intention and the driving environments are reflected on the control to adjust the driving characteristics of the vehicle.

In addition to above, in case the command sportiness index $I_{out}$ is maintained to a predetermined value, details of the accelerating, decelerating and steering operations of the driver, the current sportiness, the vehicle speed, the road gradient and so on are reflected on the command sportiness index $I_{out}$ being maintained. For example, in case the accelerator pedal is depressed deeply or abruptly, the command sportiness index $I_{out}$ is maintained strongly in long period of time so that the sportiness of the vehicle is inhibited to be reduced. As a result, the upshifting is prevented from being carried out even if the vehicle speed is increased after depressing the accelerator pedal to climb an uphill. Therefore, a reduction in the acceleration resulting from a drop in the drive torque or engine torque can be prevented. Meanwhile, the command sportiness index $I_{out}$ is maintained strongly in long period of time also in case the braking operation including the engine braking is carried out under the situation where the vehicle is driving on a downhill. Therefore, in this case, a reduction in the engine braking force can be prevented by thus preventing the execution of upshifting. To the contrary, even if the braking operation is executed strongly or erroneously under the emergent situation, the command sportiness index $I_{out}$ is maintained so that the downshifting will not be carried out more than necessary. In this case, therefore, the speed of the engine 8 can be prevented from being raised excessively. In addition, in case of control the vehicle speed by depressing both of the accelerator pedal and the brake pedal substantially simultaneously, the acceleration being generated can be suppressed while enhancing the breaking force. Further, in case of rotating the steering wheel 16, the command sportiness index $I_{out}$ is also maintained strongly in long period of time. Consequently, a reduction in the acceleration resulting from an execution of the upshifting during turning operation or a drop in the engine speed can be prevented. In this case, therefore, controllability of turning operation can be prevented from being degraded.

In addition to above, for example, in case the vehicle is climbing an uphill against the force of gravity, the acceleration sensor outputs a detection value of the acceleration larger than the actual acceleration value. In this case, therefore, the instant sportiness index $I_{in}$ is raised to the higher value than that of the case in which the vehicle is driven on a flat road. As a result, the command sportiness index $I_{out}$ is set to the higher value so that the driving characteristics of the vehicle are changed in a manner to enhance the acceleration. Thus, in case the vehicle is climbing the uphill, according to the present invention, relatively larger drive force can be generated. To the contrary, in case the vehicle is driving on a downhill, the acceleration sensor outputs a detection value of the acceleration smaller than the actual acceleration value. In this case, therefore, the instant sportiness index $I_{in}$ is lowered to the relatively smaller value. However, if the breaking operation is carried out to suppress the vehicle speed when the vehicle is driving on the downhill, gravitational acceleration is added to the acceleration during the breaking operation. As a result, the detection value of the acceleration sensor becomes relatively large, and the instant sportiness index $I_{in}$ is thereby raised. In this case, therefore, the relatively large engine braking force can be established. Thus, according to the vehicle control system of the present invention, burdens of the accelerating operation to climb the uphill and the decelerating operation to drive downhill may be eliminated or lightened so that the drivability of the vehicle can be further improved. In addition, a burden of the conventional downhill control or uphill control for inhibiting or restricting to set the speed change ratio of high speed side may also be eliminated or lightened.

As described, a degree or variation of the acceleration, and the gap between the driver's expected driving feeling and the actual behavior of the vehicle are different depending on the direction of the acceleration. Therefore, the vehicle control system of the present invention is configured to change the driving characteristics of the vehicle on the basis of the synthesized acceleration of the plurality of accelerations in different directions. For this purpose, specifically, the vehicle control system of the present invention is configured to change the degree of changing the driving characteristics of the vehicle (that is, degree of reflecting the driver's preference on the control to change the driving characteristics of the vehicle) depending on the direction of the acceleration. Therefore, the driving characteristics of the vehicle can be adjusted accurately on the basis of the synthesized acceleration.

More specifically, as described in the above-explained examples, the instant sportiness index $I_{in}$ is increased according to the acceleration in any of the directions while the vehicle is running. On the other hand, the command sportiness index $I_{out}$ is delayed to be lowered with respect to the drop in the instant sportiness index $I_{in}$. Therefore, it is also possible to increase the command sportiness index $I_{out}$ and the maximum demanded acceleration rate based on the command sportiness index $I_{out}$ according to an elapsed time or a travel distance from a start of the vehicle.

Here, the speed change ratio is not the only factor to influence or to determine the driving characteristics of the vehicle. For example, the driving characteristics of the vehicle is also influenced by the following factors, such as: the output characteristic of the engine torque governed by a relation between an output of the engine and an operating amount of the accelerator; the steering characteristic governed by a relation between a steering angle or steering force and an actual angle of the front wheel; the vibration damping characteristic of the suspension 4 governed by a constant of spring; maneuverability (i.e., turning characteristics) governed by a torque distribution rate to the front and rear wheels of the four-wheel drive vehicle, and so on. Therefore, according to the present invention, the vehicle control system is also capable of changing the above-listed characteristics on the basis of the index obtained from the acceleration. Specifically, a response of the engine 8 to output the power, that is, a rate of increasing an opening degree of the throttle valve, an assist torque of the assist mechanism relating to the so-called "direct feeling", a gear ratio of the steering mechanism 15, a torque distribution rate to the rear wheel relating to the maneuverability, are corrected according to the command sportiness index $I_{out}$. Specifically, those factors may be corrected by controlling outputs of the actuators of those mechanisms.

Figure 19:
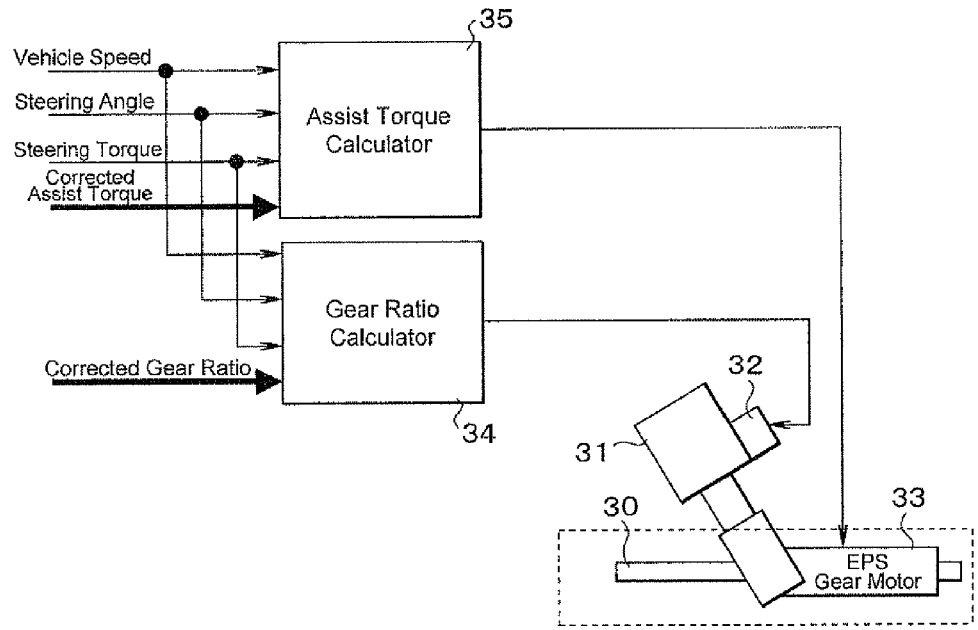
FIG. 19 is a block diagram showing a control for reflecting a corrected gear ratio and a corrected assist torque obtained on the basis of the command sportiness index on the steering characteristic.

Thus, the vehicle control system according to the present invention may be used not only to control the characteristics of acceleration and the power of the vehicle but also to control the characteristics of steering and suspension of the vehicle. FIG. 19 is a block diagram explaining a control to change the steering characteristic on the basis of the command sportiness index $I_{out}$, and in FIG. 19, there is schematically shown an electric power steering mechanism (abbreviated as EPS) comprising a variable gear ratio steering gear (abbreviated as VGRS gear). As shown in FIG. 19, in order to reciprocate a rack 30 in a width direction (i.e., in a transverse direction) by a steering force, a gear of a VGRS gear unit 31 is engaged with the rack 30, and the VGRS gear unit 31 is provided with a VGRS actuator 32 for varying the gear ratio thereof. In addition, in order to assist the reciprocation of the rack 30 in the transverse direction, the electric power steering mechanism is provided with an EPS gear motor 33. Meanwhile, the ECU comprises: a gear ratio calculation part 34 adapted to change the gear ratio of the VGRS gear unit 31 by outputting a command signal to the VGRS actuator 32; and an assist torque calculation part 35 adapted to calculate a required torque of the EPS gear motor 33 (i.e., a thrust to be applied to the rack 30) and to output the calculated torque to the VGRS actuator 32 in the form of a command signal. Here, conventional electric power steering mechanism and calculators may be used in this example.

As shown in FIG. 19, data about a vehicle speed, a steering angle, and a steering torque are inputted to those calculation parts 34 and 35, and those data may be detected by sensors. In addition, a corrected gear ratio is inputted to the gear ratio calculation part 34. Specifically, the corrected gear ratio is used to correct the command signal to be transmitted to the VGRS actuator 32 according to the command sportiness index $I_{out}$. For this purpose, a map in which a relation between the corrected gear ratio and the sportiness index $I_{out}$ is determined according to need is prepared in advance, and the corrected gear ratio is determined with reference to the map thus prepared.

Meanwhile, in addition to the data about the vehicle speed, the steering angle, and the steering torque, a corrected assist torque is inputted to the assist torque calculation part 35. Specifically, the assist torque is used to correct the command signal to be transmitted to EPS gear motor 33 according to the command sportiness index $I_{out}$. For this purpose, a map in which a relation between the corrected assist torque and the command sportiness index $I_{out}$ is determined according to need is prepared in advance, and the corrected assist torque is determined with reference to the map thus prepared.

Thus, according to the example shown in FIG. 19, the gear ratio of the VGRS gear unit 31, and the torque for assisting the steering force are varied according to a change in the command sportiness index $I_{out}$ determined on the basis of the acceleration of the vehicle.

Figure 20:
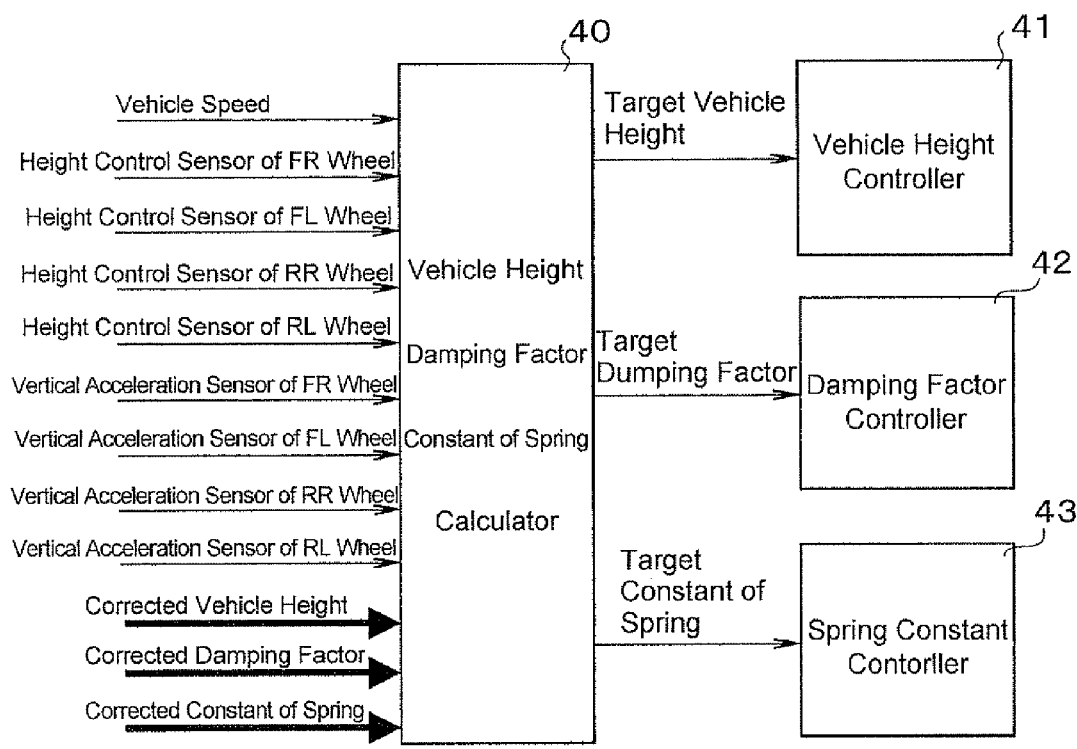
FIG. 20 is a block diagram showing a control for reflecting a vehicle height, a corrected damping factor, and a corrected constant of spring obtained on the basis of the command sportiness index on the suspension characteristic.

FIG. 20 is a block diagram explaining a control to change the characteristic of the suspension on the basis of the command sportiness index $I_{out}$. Specifically, according to the control shown in FIG. 20, a vehicle height achieved by the (not shown) suspension, and a vibration damping factor and a constant of spring of the suspension are controlled on the basis of the command sportiness index $I_{out}$. In order to calculate target values of the vehicle height, the vibration damping factor, and the constant of spring, there is provided a calculation part 40. Specifically, the calculation part 40 is composed mainly of a microcomputer, and configured to calculate the target values of the vehicle height, the vibration damping factor, and the constant of spring using data inputted thereto and data stored therein in advance. For example, detection signals from a vehicle speed sensor, a height control sensor of the front right (FR) wheel, a height control sensor of the front left (FL) wheel, a height control sensor of the rear right (RR) wheel, a height control sensor of the rear left (RL) wheel, a vertical acceleration sensor of the front right (FR) wheel, a vertical acceleration sensor of the front left (FL) wheel, a vertical acceleration sensor of the rear right (RR) wheel, and a vertical acceleration sensor of the rear left (RL) wheel, are inputted to the calculation part 40. Here, conventional sensors may be used as the above-listed sensors.

In addition, in order to control the suspension characteristic, a corrected vehicle height, a corrected vibration damping factor, and a corrected constant of spring are inputted to the calculation part 40. Specifically, the corrected vehicle height is used to correct the vehicle height according to the command sportiness index $I_{out}$. For this purpose, a map in which the corrected vehicle height is determined in accordance with the command sportiness index $I_{out}$ is prepared in advance, and the corrected vehicle height is determined with reference to the map thus prepared. Meanwhile, the corrected damping factor is used to correct the damping factor of a vibration damping device such as a shock absorber. For this purpose, a map in which the corrected damping factor is determined in accordance with the command sportiness index $I_{out}$ is prepared in advance, and the corrected damping factor is determined with reference to the map thus prepared. Specifically, the corrected damping factor is increased according to an increase in the command sportiness index $I_{out}$, and if the corrected damping factor is large, a hardness of the suspension is enhanced. Likewise, the corrected constant of spring is used to correct the constant of spring in the suspension. For this purpose, a map in which the corrected constant of spring is determined in accordance with and the command sportiness index $I_{out}$ is prepared in advance, and the corrected constant of spring is determined with reference to the map thus prepared. The corrected constant of spring is also increased according to an increase in the command sportiness index $I_{out}$, and if the corrected constant of spring is large, the hardness of the suspension is also enhanced.

As shown in FIG. 20, the calculation part 40 is configured to carry out a calculation using the above-explained data. As a result of the calculation, a calculated target vehicle height is transmitted to a vehicle height control part 41 in the form of a command signal, and the vehicle height is changed according to the command sportiness index $I_{out}$. Specifically, the vehicle height is lowered relatively in case the command sportiness index $I_{out}$ is relatively large. Likewise, a target damping factor calculated by the calculation part 40 is transmitted to a damping factor control part 42 in the form of a command signal, and damping factor is changed according to the command sportiness index $I_{out}$. Specifically, the damping factor is increased relatively in case the command sportiness index $I_{out}$ is relatively large. Likewise, a target constant of spring calculated by the calculation part 40 is transmitted to a spring constant control part 43 in the form of a command signal, and the constant of spring is changed according to the command sportiness index $I_{out}$. Specifically, the constant of spring is increased relatively in case the command sportiness index $I_{out}$ is relatively large.

Thus, the vehicle control system of the present invention is capable of adjusting the suspension characteristic in accordance with the driver's intention, the driving environment, and the driving condition of the vehicle, by thus changing the suspension characteristic according to the command sportiness index $I_{out}$ determined on the basis of the acceleration (e.g., the longitudinal acceleration Gx and the lateral acceleration Gy). Therefore, in case the longitudinal acceleration and/or the lateral acceleration of the vehicle being driven is/are relatively small so that the vehicle is running smoothly, the suspension is softened and riding comfort of the vehicle is thereby improved. To the contrary, in case the longitudinal acceleration and/or the lateral acceleration of the vehicle being driven is/are relatively large, that is, in case an agile response of the vehicle is required, the hardness of the suspension is increased. In this case, therefore, a depression or bounce of the vehicle body above the wheels, and a rolling or a pitching of the vehicle and so on can be reduced. Consequently, drivability of the vehicle can be improved. As described, the acceleration may be calculated on the basis of the absolute value of the acceleration detected by the acceleration sensor, or on the basis of information about the operating system and behavior of the vehicle. Alternatively, the acceleration may also be calculated on the basis of the absolute value of the acceleration in combination with the above-mentioned information.

As described, the vehicle control system of the present invention is configured to facilitate a satisfaction of the judgment of execution of the turning operation of the vehicle, to complicate to reflect the longitudinal acceleration on the index, and to facilitate lowering of the index, by carrying out the controls explained in the above examples. Alternatively, according to the present invention, the above-listed controls may also be carried out by numerically treating the detected data or data to be compared with the detected data according to needs.

For example, according to the above-explained control shown in FIG. 13, the speed change ratio or the gear stage is set on the basis of the maximum demanded acceleration rate obtained on the basis of the command sportiness index $I_{out}$. According to the controls shown in FIGS. 16 to 18, the speed change control and the engine control are carried out by calculating the corrected drive force, the corrected gear stage, and the corrected opening of the throttle valve on the basis of the command sportiness index $I_{out}$, thereby correcting those factors by the calculated correction values. According to the control shown in FIG. 19, the corrected assist torque and the corrected gear ratio are calculated on the basis of the command sportiness index $I_{out}$, and the control amount of the power steering mechanism is corrected by those values. In addition, according to the control shown in FIG. 20, the correction values of the vehicle height achieved by the suspension, and the damping factor and the constant of spring of the suspension are calculated on the basis of the command sportiness index $I_{out}$, and those factors are corrected by the calculated correction values thereby controlling the suspension. As described, the relation between the command sportiness index $I_{out}$ and each of the correction values is determined in the form of map, and the correction value in accordance with the sportiness index $I_{out}$ is calculated with reference to the map. That is, the relation between the command sportiness index $I_{out}$ and each of the correction values has to rely on the maps thus prepared in advance. However, even if the relation between the command sportiness index $I_{out}$ and each of the correction values is determined by averaging a lot of corrected sample data, a range of the driver's preference and intention is rather wide. Therefore, according to the present invention, the vehicle control system may also be configured to eliminate the gap between the driving characteristics of the vehicle adjusted on the basis of the command sportiness index $I_{out}$ and the driver's expected drive feeling.

Figure 21:
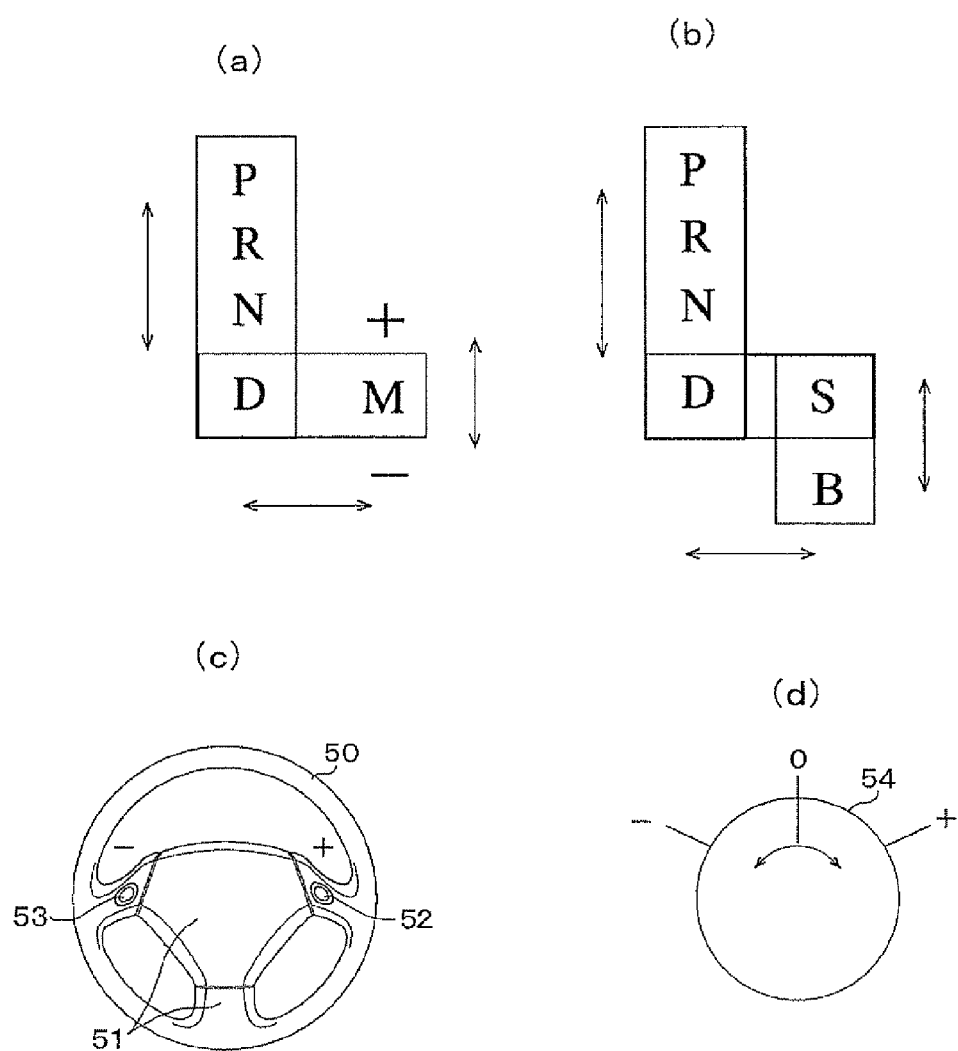
FIGS. 21 (a) to (d) are views schematically showing shift positions and a rotary switch of an operation mechanism for changing the speed change ratio manually.

An example of the above-mentioned control will be explained hereinafter. The gap between the driving characteristics of the vehicle adjusted on the basis of the command sportiness index $I_{out}$ and the driver's expected drive feeling cannot be detected or measured directly. However, in case there is a gap between the driving characteristics of the vehicle and the driver's expected drive feeling, the driver will carry out a manual operation such as a shifting operation in most situations. Therefore, such gap between the driving characteristics of the vehicle and the driver's expected drive feeling may be detected or judged by detecting an execution of the manual operation. Here will be explained an example of a mechanism to be operated manually. FIG. 21 shows an example of an operation mechanism for changing the speed change ratio manually. Specifically, FIG. 21 (a) shows shift positions of a gate-type shifting device for changing the gear stage of the transmission 13 manually. The shifting device shown in FIG. 21 (a) is configured to set a drive mode (i.e., a drive range) by shifting a not shown shift lever to a desired shift position. Specifically, in the shifting mechanism shown in FIG. 21 (a), "P" is a parking position for keeping the vehicle to be parked, "R" is a reverse position for driving the vehicle backwardly, "N" is a neutral position where the power will not be transmitted to the wheels, "D" is a drive position for driving the vehicle in the forward direction while setting an appropriate speed change ratio automatically according to the opening degree of the accelerator or the like, and "M" is a manual position where the speed change ratio can be changed manually by operating the shift lever. In case the shift position is in the manual position, the gear stage is shifted to the upper stage or the speed change ratio is reduced in a predetermined amount every time the shift lever is moved to an upshift position indicated as "+". To the contrary, the gear stage is shifted to the lower stage or the speed change ratio is increased in a predetermined amount every time the shift lever is moved to a downshift position indicated as "−".

FIG. 21(b) shows another shifting device of the transmission 13 capable of selecting an engine breaking range where a range of the available speed change ratio is narrowed. In the shifting device shown in FIG. 21 (b), "P", "R", "N" and "D" positions are identical to those in the shifting device shown in FIG. 21 (a). In the shifting device shown in FIG. 21 (b), "S" position located adjacent to "P" position is a first engine brake position where the speed change ratio of the high speed side is inhibited to restrict the range of available speed change ratio narrower than that under the drive position, and "B" position is a second engine brake position where the speed change ratio of the high speed side is further inhibited to restrict the range of available speed change ratio narrower than that under the first engine brake position.

FIG. 21 (c) shows still another example of the shifting device configured to carry out the upshifting and the downshifting by pushing buttons. As shown in FIG. 21 (c), an up switch 52 and a down switch 53 are arranged on both sides of a spoke 51 of the steering wheel 50. Those switches 52 and 53 are configured to output a signal every time when pushed. In addition, those switches 52 and 53 are configured to be activated in case a specific shift position such as the manual position is selected by a not shown lever type shifting device. Specifically, every time the up switch 52 is pushed, the up switch 52 outputs a signal for shifting the gear stage to the upper stage or decreasing the speed change ratio in a predetermined amount. Meanwhile, every time the down switch 53 is pushed, the down switch 53 outputs a signal for shifting the gear stage to the lower stage or increasing the speed change ratio in a predetermined amount.

FIG. 21 (d) shows a rotary switch 54 for manually adjusting the speed change ratio which is set automatically. Specifically, in case the rotary switch 54 is turned to "+" side, the upshifting is facilitated at relatively low speed. To the contrary, in case the rotary switch 54 is turned to "−" side, the upshifting will not be carried out easily so that the speed change ratio is kept to a relatively large ratio. This kind of control may be carried out by correcting the speed change map, or by correcting the parameters for selecting the speed change ratio such as the vehicle speed, the opening degree of the accelerator, and the target engine speed, in accordance with an operating amount of the rotary switch 54. In addition, the rotary switch 54 may also be configured to prevent the execution of upshifting when it is turned to "+" side, and to facilitate the upshifting at relatively low speed when it is turned to "−" side.

Thus, the gear stage or the speed change ratio can be shifted or changed manually by any of those shifting devices shown in FIG. 21. In addition, the rotary switch shown in FIG. 21 (d) may also be used to adjust the hardness of the suspension, the vehicle height, the assisting amount by the power steering mechanism, the relation between the output of the engine and the opening degree of the accelerator and so on.

Figure 22:
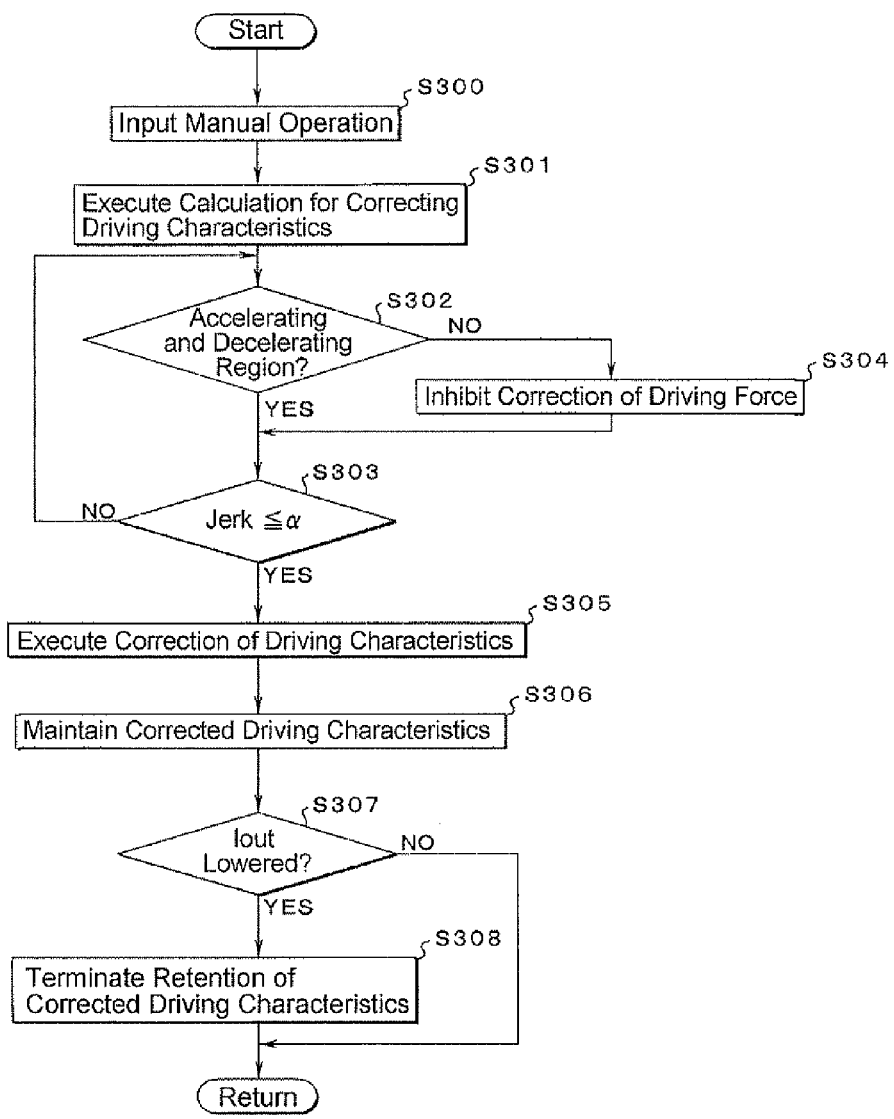
FIG. 22 is a flowchart explaining a control example for correcting the driving characteristics based on the manual operation.

For example, in case the speed change ratio is changed by operating any of the shifting devices shown in FIG. 21 manually, or in case the hardness of the suspension, the vehicle height, or the assisting amount by the power steering mechanism is changed by a not shown rotary switch or the like, it is considered that the driver may not be satisfied with the current driving characteristics of the vehicle. In this case, therefore, a correction of the driving characteristics of the vehicle is carried out. FIG. 22 is a flowchart explaining an example of the correction of the driving characteristics. The routine shown in FIG. 22 is repeated at predetermined short interval under the situation in which driving characteristics of the vehicle is set on the basis of the command sportiness index $I_{out}$ determined based on the acceleration. First of all, details of an executed manual operation are inputted (at step S300). Specifically, details and amount of the manual speed change operation by the shifting device shown in FIG. 21, or the manual operation for changing the hardness of the suspension, the vehicle height, or the assisting amount by the power steering mechanism, are inputted at step S300. Then, a calculation for correcting the driving characteristics set by the manual operation is carried out (at step S301).

Specifically, the driving characteristics to be corrected include characteristics of a chassis and the drive force. More specifically, the characteristics of the chassis include the characteristic of the suspension mechanism and the turning characteristic of the power steering mechanism, and the characteristics of the drive force include the characteristic of the output characteristic of the engine and the speed change characteristic of the transmission. At step S301, a correction value of at least one of those characteristics is calculated, however, as described, the driving characteristics of the vehicle are governed by a plurality of parameters including the acceleration. Therefore, instead of thus calculating the correction value and of the driving characteristics directly, a correction value or a content of the correction of any of those parameters determining the driving characteristics may also be calculated at step S301.

In this case, for example, the instant sportiness index $I_{in}$ is corrected first of all. In the above-explained examples, the instant sportiness index $I_{in}$ is calculated on the basis of the synthesized acceleration of the longitudinal acceleration Gx and the lateral acceleration Gy (or the absolute value thereof). However, in this case, the instant sportiness index $I_{in}$ is corrected and the command sportiness index $I_{out}$ is determined on the basis of the corrected instant sportiness index $I_{in}$. Specifically, in case the manual operation is carried out in a manner to enhance the sportiness of the vehicle, the instant sportiness index $I_{in}$ is corrected to be increased by multiplying the instant sportiness index $I_{in}$ by a predetermined factor larger than "1". To the contrary, in case the manual operation is carried out in a manner to moderate the sportiness of the vehicle, the instant sportiness index $I_{in}$ is corrected to be decreased by multiplying the instant sportiness index $I_{in}$ by a predetermined factor smaller than "1". Specifically, the factor thus used to correct the instant sportiness index $I_{in}$ is a constant value not to provide any unexpected feeling to the driver, and the instant sportiness index $I_{in}$ is corrected by this factor every time the above-explained manual operation is executed. Alternatively, it is also possible to prepare a variable factor or a plurality of factors in accordance with the contents of the manual operations, and to select the appropriate factor depending on the content of the executed manual operation. In addition, the above-explained normalization rate and the weighting factor used to normalize the accelerations Gx and Gy may also be changed depending on the content of the executed manual operation. Here, the manual operation to enhance the sportiness of the vehicle includes the downshift operation, the operation to increase the hardness of the suspension mechanism, the operation to lower the vehicle height, and the operation to enhance the direct feeling of the steering by reducing the assisting amount of the power steering mechanism. Meanwhile, the manual operation to moderate the sportiness of the vehicle includes the operations opposite to the above-listed operations.

Instead of thus correcting the instant sportiness index $I_{in}$, at step S301, it is also possible to correct the command sportiness index $I_{out}$ determined on the basis of the instant sportiness index $I_{in}$. In this case, such correction of the command sportiness index $I_{out}$ may be carried out in accordance with the details of the executed manual operations, as the case of correcting the instant sportiness index $I_{in}$. In addition, instead of thus correcting the instant sportiness index $I_{in}$ or the command sportiness index $I_{out}$, it is also possible to correct any of the basic characteristics determined in accordance with the command sportiness index $I_{out}$ such as the maximum demanded acceleration rate, the corrected drive force, the corrected gear stage, the corrected opening degree of the throttle valve, the corrected assist torque, the corrected gear ratio, the corrected vehicle height, the corrected damping factor, the corrected constant of spring and so on. Specifically, those factors are corrected in the direction or in the amount to enhance the sportiness of the vehicle in case the manual operation to enhance the sportiness is carried out. To the contrary, in case the manual operation to moderate the sportiness of the vehicle is carried out, those factors are corrected in the direction or in the amount to moderate the sportiness to drive the vehicle smoothly or mildly. In this case, as in the case of correcting the instant sportiness index $I_{in}$, the above-mentioned basic characteristics are corrected by carrying out any of four arithmetic operations using a factor prepared in advance.

After carrying out the above-explained correction at step S301, it is judged whether or not a condition to execute the correction is satisfied. For example, such correction of the driving characteristics of the vehicle being explained is carried out when the acceleration or the steering angle of the vehicle is changed manually while the vehicle is running. In this case, since the vehicle is thus running, those manual operations may be carried out under the situation where the vehicle has already been accelerated, decelerated or turned. If those accelerating/decelerating operation or the turning operation is overlapped with the ongoing change in the acceleration/deceleration or the turning angle of the vehicle, an actual behavior of the vehicle may be deviated from the expected behavior of the driver, and the driver may feel uncomfortable feeling. Therefore, at the subsequent step, it is judged whether or not a current condition of the vehicle is within a condition where the driver will not feel the uncomfortable feeling, or where the uncomfortable feeling of the driver can be reduced if the correction is carried out. For this purpose, it is judged whether or not the longitudinal acceleration of the vehicle (i.e., acceleration and braking) is within a predetermined region (at step S302). Specifically, the predetermined region is set in a region in the friction circle shown in FIG. 2 where the component of the longitudinal acceleration Gx accounts for a substantial proportion of the synthesized acceleration (i.e., the instant sportiness index $I_{in}$). For example, the predetermined region is defined by lines extending individually on both sides of the line representing the longitudinal acceleration Gx from a center of the friction circle at an angle of 45 degree, plus minus 5 degree. Such predetermined region is defined not only in the acceleration region but also in the deceleration side as a braking region. That is, remaining regions in the friction circle other than the acceleration region and the braking region are turning regions. Therefore, the components of the lateral acceleration Gy in the turning regions are larger than those in the acceleration and braking regions.

In case the driving condition of the vehicle is within the acceleration region or the braking region so that the answer of step 302 is YES, it is judged whether or not a current jerk (i.e., a temporal differential value of the acceleration or a variation of the acceleration per unit of time) is smaller than a predetermined criterion value α (at step S303). That is, the judgment of step S303 is carried out to judge whether or not the acceleration of the vehicle is stabilized. Therefore, the aforementioned criterion value α is set to a value close to "0", and the judgment of step S303 is carried out instead of judging whether or not the jerk is "0".

To the contrary, in case the answer of step S302 is NO, the correction of the driving force is inhibited (at step S304), and then, the routine advances to step S303. That is, in case the answer of step S302 is NO, the driving condition of the vehicle is in the aforementioned turning region. In this situation, if the driving force (or drive torque) is changed as a result of changing the output of the engine or the speed change ratio, the driver may feel uncomfortable feeling. In this case, therefore, the correction of the drive force is inhibited. However, in this case, the correction of the characteristic of the chassis, specifically, the characteristics of the suspension and the steering are allowed.

In case the answer of step S303 is NO, the routine is returned to step S302. That is, even in case the vehicle is running substantially straight ahead so that the answer of step S302 is YES, the answer of step S303 is NO if the longitudinal acceleration is being changed. In this situation, if the behavior of the vehicle is changed by carrying out a correction of the driving characteristics simultaneously with the ongoing change in the acceleration, unexpected change in the behavior is added to the intentional change in the behavior of the vehicle. As a result, the drive feeling of the vehicle may be deviated from the driver's expected feeling, and the driver may feel uncomfortable feeling. For this reason, in case the answer of step S303 is NO, the routine is returned to step S302 thereby inhibiting the correction of the driving characteristics of the vehicle.

To the contrary, in case the jerk is smaller than the criterion value α so that the answer of step S303 is YES, the correction of the driving characteristics is carried out (at step S305). Specifically, at step S305, a timing control is carried out to determine a timing to change the driving force of the engine, the speed change ratio of the transmission, the control amounts of the suspension and the power steering, on the basis of the correction values calculated at step S301. As a result, an intention of the driver emerging as the manual operation can be reflected on the driving characteristics of the vehicle such as the driving force, the speed change ratio, the suspension and so on at an appropriate timing.

Then, the driving characteristics thus corrected are maintained (at step S306). For example, the above-explained correction amount is stored, or the basic characteristics are changed based on the correction values. That is, a learning correction is carried out at step S306. Therefore, the behavior of the vehicle can be adjusted in line with the driver's intention or driver's expected drive feeling while the driver is driving the vehicle. For this reason, a necessity to carry out the manual operation repeatedly is eliminated so that the driver is allowed to drive the vehicle without feeling any uncomfortable feeling. As a result, the drivability of the vehicle is improved.

The driving characteristics thus corrected may be maintained until a next occasion to carry out the correction. However, the manual operation is executed according to the driving preference which changes depending on the driver, and according to the driving environment such as the road condition, traffic, area etc. Therefore, in case the command sportiness index $I_{out}$ drops, retention of the corrected driving characteristics may be terminated. For this purpose, subsequent to step S306, it is judged whether or not the command sportiness index $I_{out}$ is lowered (at step S307). Such lowering or reduction of the command sportiness index $I_{out}$ has already been explained with reference to FIGS. 4 to 9. In case the answer of step S307 is NO, the routine is returned to continue the retention of the corrected driving characteristics. To the contrary, in case the answer of step S307 is YES, the retention of the corrected driving characteristics is terminated (at step S308), and the routine is returned. In this case, specifically, the aforementioned basic characteristics are set as the driving characteristics of the vehicle instead of the command sportiness index $I_{out}$. Here, the aforementioned manual operations and the correction of the driving characteristics of the vehicle are carried out in different ways depending on the driver. Therefore, the correction of the driving characteristics of the vehicle may be reset if the main switch of the vehicle is turned off.

Figure 23:
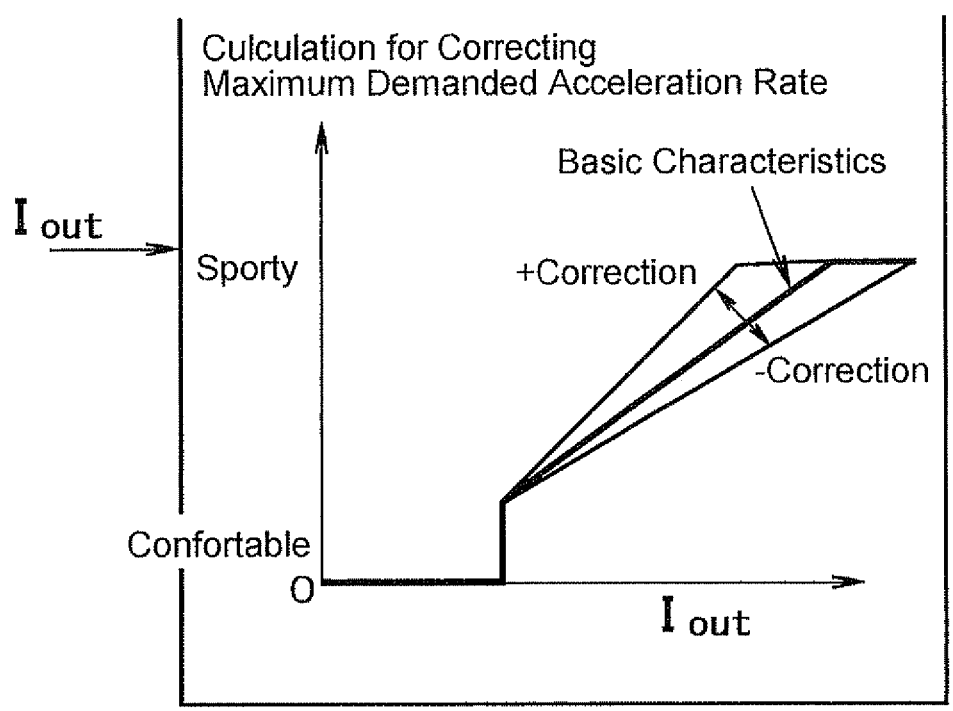
FIG. 23 is a map for correcting the maximum demanded acceleration rate based on the manual operation.

FIG. 23 shows an example of a map for correcting the characteristics of the driving force (i.e., the maximum demanded acceleration rate) by the manual operation. Specifically, a relation between the command sportiness index $I_{out}$ and the maximum demanded acceleration rate is indicated in FIG. 23, and a heavy line represents the basis characteristics. That is, the basic characteristics is determined to be used to calculate the maximum demanded acceleration rate on the basis of the command sportiness index $I_{out}$, in case the manual operation such as the manual shifting operation is not being carried out. Meanwhile, thin lines are corrected characteristic lines prepared to be used in case the manual operation is carried out. Specifically, in FIG. 23, a line with a caption "+correction" is a characteristic line to be used in case the manual operation to enhance the sportiness such as the down shifting is carried out. Therefore, this line is set in a manner to increase the maximum demanded acceleration rate based on the command sportiness index $I_{out}$ larger than that under the basic characteristics. Meanwhile, a line with caption "−correction" is a characteristic line to be used in case the manual operation to reduce the sportiness such as the upshifting. Therefore, this line is set in a manner to decrease the maximum demanded acceleration rate based on the command sportiness index $I_{out}$ smaller than that under the basic characteristics. The maximum demanded acceleration rate thus obtained on the basis of the corrected characteristic line is used to control the output of the engine and to control the speed change ratio upon the satisfaction of the condition to carry out the correction. Therefore, the driving force (i.e., the drive torque) is corrected by carrying out the correction of the output of the engine and the speed change ratio.

Thus, the vehicle control system according to the present invention is configured to correct the driving characteristics of the vehicle based on an execution of the manual operation. However, the vehicle control system should not be limited to be configured to correct the driving force based on the execution of the speed change operation. For example, according to the present invention, the vehicle control system may also be configured to reflect the details of the manual operation to change the characteristics of the steering, the engine output, suspension etc. on the driving characteristics of the vehicle on the basis of an execution of the manual speed change operation. Likewise, the manual operation should not be limited to the operation to change the output characteristics. For example, the vehicle control system may also be configured to carry out the correction in a manner to reflect the detail of the manual operation to change the characteristics of the steering and the suspension on the entire driving characteristics of the vehicle.

As explained, the vehicle control system according to the present invention is configured to adjust the driving characteristics finely upon the execution of the manual operation of the driver to change the constant of the spring of the suspension as the damping factor. Therefore, the deriving characteristics of the vehicle can be adjusted finely in line with the intention of the driver or the driving preference of the driver.

The invention claimed is:

1. A vehicle control system, which is configured to change an index for setting driving characteristics of a vehicle, wherein:
   the index is changed according to acceleration of the vehicle;
   a manner of changing the index is differentiated depending on a detail of an operation for changing acceleration executed by a driver;
   the index determined on the basis of a large absolute value of the acceleration is inhibited to be lowered to the index to be determined on the basis of a small absolute value of the acceleration, in case an amount of the operation or a change rate of the amount of the operation is large; and
   the index determined on the basis of a large absolute value of the acceleration is facilitated to be lowered to the index to be determined on the basis of a small absolute value of the acceleration, in case an amount of the operation or a change rate of amount of the operation is small;
   the index is configured to increase agility of the vehicle by being increased;
   an instant index is determined by synthesizing absolute values of a longitudinal acceleration and a lateral acceleration of the vehicle;
   the index is increased to an increased value of the instant index which is larger than a prior value;
   the index is lowered after a delay with respect to a drop of the instant index from said increased value at which the index is maintained; and
   the index determined on the basis of a large absolute value of the acceleration is inhibited to be lowered to the index to be determined on the basis of a small absolute value of the acceleration, by extending time to hold a current value of the index, in case an amount of the operation or a change rate of the amount of the operation is large.

2. The vehicle control system as claimed in claim 1, wherein:
   the index determined on the basis of a large instant index is inhibited to be lowered to the index to be determined on the basis of a small instant index in case a current index is determined on the basis of the large instant index, in comparison with a case in which the index is determined on the basis of the small instant index.

3. The vehicle control system as claimed in claim 1, wherein the index includes:
   a first index, which is determined on the basis of actual acceleration detected by an acceleration sensor, and which is increased according to an increase in an absolute value of the actual acceleration, and
   a second index, which is determined on the basis of estimated acceleration estimated by an acceleration estimating means, and which is increased according to an increase in an absolute value of the estimated acceleration; and
   wherein the driving characteristics are adjusted on the basis of a larger index out of said first and second indexes.

4. The vehicle control system as claimed in claim 1, wherein the operation of the driver includes at least any of:
   an accelerating operation for changing an output of a prime mover of the vehicle;
   a braking operation for braking the vehicle; and
   a steering operation for changing a traveling direction of the vehicle.

5. The vehicle control system as claimed in claim 4, wherein:
   the index determined on the basis of a large instant index is inhibited to be lowered to the index to be determined on the basis of a small instant index by extending a time to hold the index determined on the basis of the large instant index, in case the index determined on the basis of the large instant index is being maintained;
   the index determined on the basis of the large instant index is inhibited to be lowered to the index to be determined on the basis of the small instant index by reducing a changing rate of the index determined on the basis of the large instant index, or by stopping the change of the index determined on the basis of the large instant index, in case the index determined on the basis of the large instant index is being changed;
   the index determined on the basis of the large instant index is further inhibited to be lowered to the index to be determined on the basis of the small instant index, in any of the following case, in which
   an operating amount or an increasing rate of the accelerating operation in a direction to increase the output of the prime mover of the vehicle is large,
   the braking operation is executed or an operating amount of the braking operation is increased, and
   a steering angle or an increasing rate of the steering angle of the steering operation is large.

6. The vehicle control system as claimed in claim 1, wherein
   the index determined on the basis of a large instant index is inhibited to be lowered to the index to be determined on the basis of a small instant index by extending a time to hold the index determined on the basis of the large instant index, in case the index determined on the basis of the large instant index is being maintained; and
   the index determined on the basis of the large instant index is inhibited to be lowered to the index to be determined on the basis of the small instant index by reducing a changing rate of the index determined on the basis of the large instant index, or by stopping the change of the index determined on the basis of the large instant index, in case the index determined on the basis of the large instant index is being lowered.

* * * * *